US012586233B2

(12) United States Patent
Hong et al.

(10) Patent No.: US 12,586,233 B2
(45) Date of Patent: Mar. 24, 2026

(54) ELECTRONIC DEVICE AND METHOD FOR PROVIDING STORE PAYMENT SERVICE

(71) Applicant: FAINDERS.AI INC., Seoul (KR)

(72) Inventors: Suk Bum Hong, Seoul (KR); Myung Won Ham, Seoul (KR); Byung Hun Lee, Seoul (KR); Su Min Lim, Siheung-si (KR); Sung Bin Park, Seoul (KR); Ji Hyun Kim, Yongin-si (KR); Hyung Jun Ahn, Seoul (KR)

(73) Assignee: FAINDERS.AI INC., Seoul (KR)

( * ) Notice: Subject to any disclaimer, the term of this patent is extended or adjusted under 35 U.S.C. 154(b) by 274 days.

(21) Appl. No.: 18/495,361

(22) Filed: Oct. 26, 2023

(65) Prior Publication Data

US 2024/0346681 A1 Oct. 17, 2024

(30) Foreign Application Priority Data

Apr. 17, 2023 (KR) ......................... 10-2023-0050004

(51) Int. Cl.
*G06T 7/70* (2017.01)
*G06Q 10/087* (2023.01)
*G06V 40/10* (2022.01)

(52) U.S. Cl.
CPC ............. *G06T 7/70* (2017.01); *G06Q 10/087* (2013.01); *G06V 40/103* (2022.01); *G06T 2207/30196* (2013.01)

(58) Field of Classification Search
CPC ............. G06T 7/70; G06T 2207/30196; G06V 40/103; G07G 1/0036; G07G 1/0054;
(Continued)

(56) References Cited

U.S. PATENT DOCUMENTS

2021/0304121 A1*  9/2021  Lee ........................ G06F 16/215
2022/0067689 A1*  3/2022  Guack ..................... G06T 7/251
2022/0230216 A1*  7/2022  Buibas ................... G06Q 30/02

FOREIGN PATENT DOCUMENTS

JP        2022059044 A  *  4/2022  ......... G06F 3/03547
JP        2023014207 A      1/2023
(Continued)

OTHER PUBLICATIONS

Notice of Refusal received in Japanese Application No. 2023173464, dated Jul. 4, 2024. 10 Pages, including translation.

*Primary Examiner* — Delomia L Gilliard
(74) *Attorney, Agent, or Firm* — AEON Law, PLLC; Adam L. K. Philipp; Ki Yong O

(57) ABSTRACT

A electronic device and method for providing store payment service are provided. An electronic device for providing store payment service comprising a processor; and a memory operatively coupled to the processor, wherein the memory, when executed, causes the processor to identify first tracking data of the tracking data corresponding to a first time period including the trigger time point, identify a user candidate group for at least some of the at least one user based on the first tracking data, calculate a first reliability for each of the at least some users included in the user candidate group, identify that a user related to the trigger is a first user based on the first reliability, and store instructions for performing an update related to the trigger for a virtual shopping cart of the first user.

8 Claims, 17 Drawing Sheets

(58) Field of Classification Search
CPC .. G07G 1/0063; G06Q 10/087; G06Q 20/203;
G06Q 20/208
See application file for complete search history.

(56) References Cited

FOREIGN PATENT DOCUMENTS

| KR | 102154720 B1 | 9/2020 | |
| KR | 102451378 B1 | 10/2022 | |
| KR | 20220136050 A * | 10/2022 | ............. G06V 40/10 |

* cited by examiner

FIG. 2

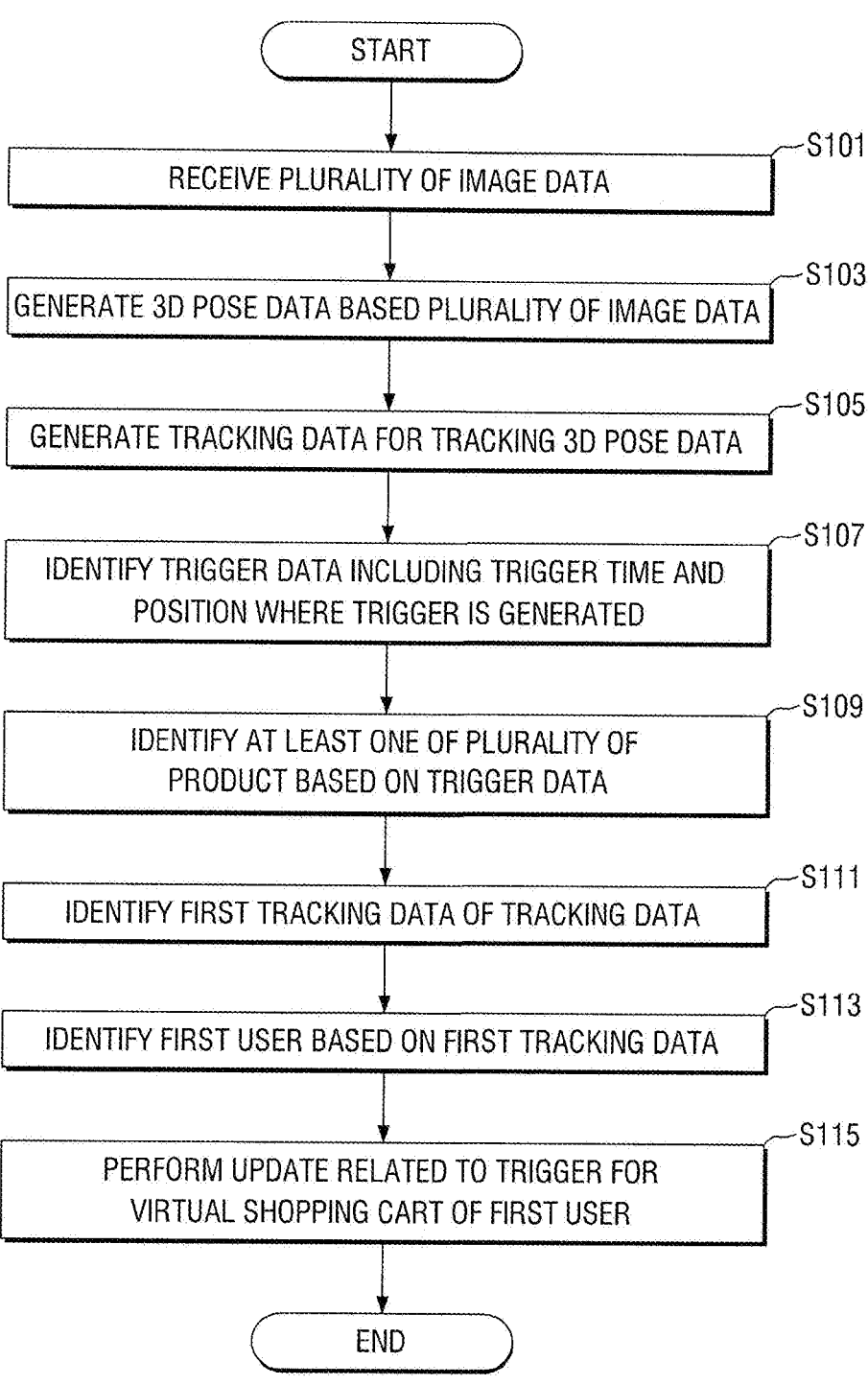

START

RECEIVE PLURALITY OF IMAGE DATA — S101

GENERATE 3D POSE DATA BASED PLURALITY OF IMAGE DATA — S103

GENERATE TRACKING DATA FOR TRACKING 3D POSE DATA — S105

IDENTIFY TRIGGER DATA INCLUDING TRIGGER TIME AND POSITION WHERE TRIGGER IS GENERATED — S107

IDENTIFY AT LEAST ONE OF PLURALITY OF PRODUCT BASED ON TRIGGER DATA — S109

IDENTIFY FIRST TRACKING DATA OF TRACKING DATA — S111

IDENTIFY FIRST USER BASED ON FIRST TRACKING DATA — S113

PERFORM UPDATE RELATED TO TRIGGER FOR VIRTUAL SHOPPING CART OF FIRST USER — S115

END

START

IDENTIFY SHELF IMAGE DATA FOR TRIGGER TIME POINT    S301

IDENTIFY PRODUCT DETECTION IMAGE DATA RELATED TO
USER CANDIDATE GROUP IN FIRST TIME PERIOD    S302

IDENTIFY FIRST PRODUCT BASED ON AT LEAST ONE OF
SHELF IMAGE DATA, PRODUCT DETECTION IMAGE DATA,
AND POSITION WHERE TRIGGER IS GENERATED    S303

END

FIG. 13A

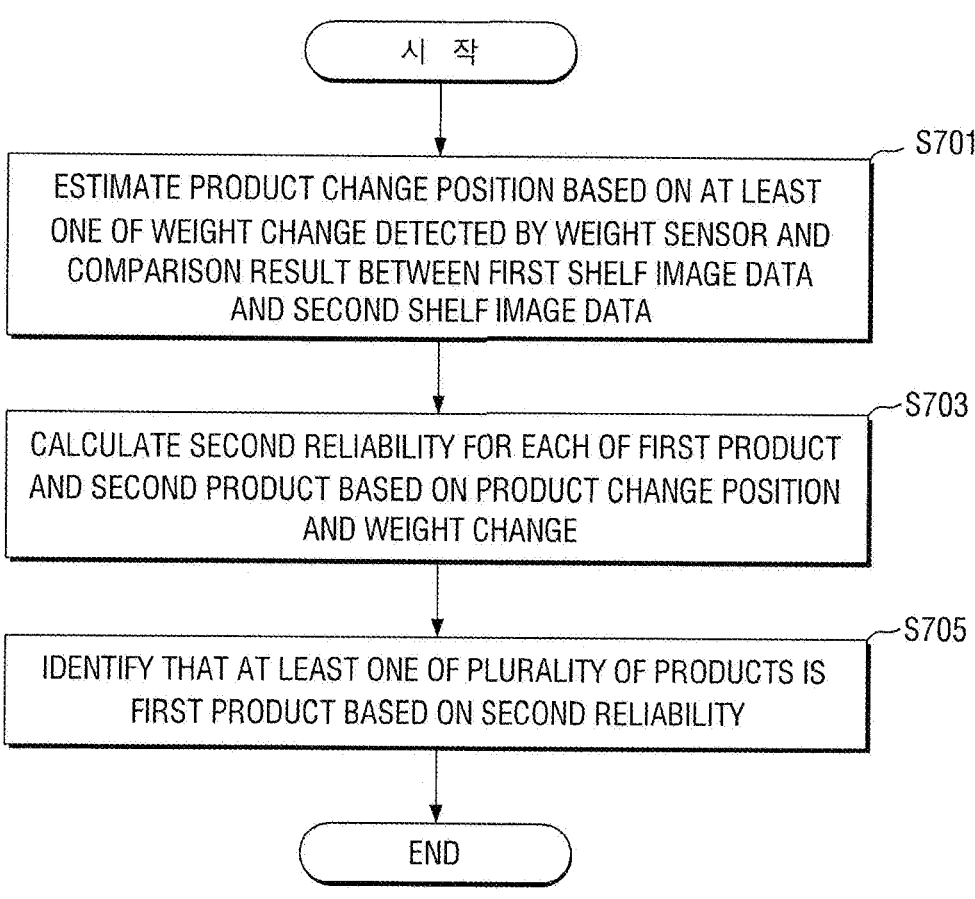

시 작

ESTIMATE PRODUCT CHANGE POSITION BASED ON AT LEAST
ONE OF WEIGHT CHANGE DETECTED BY WEIGHT SENSOR AND
COMPARISON RESULT BETWEEN FIRST SHELF IMAGE DATA
AND SECOND SHELF IMAGE DATA — S701

CALCULATE SECOND RELIABILITY FOR EACH OF FIRST PRODUCT
AND SECOND PRODUCT BASED ON PRODUCT CHANGE POSITION
AND WEIGHT CHANGE — S703

IDENTIFY THAT AT LEAST ONE OF PLURALITY OF PRODUCTS IS
FIRST PRODUCT BASED ON SECOND RELIABILITY — S705

END

FIG. 17

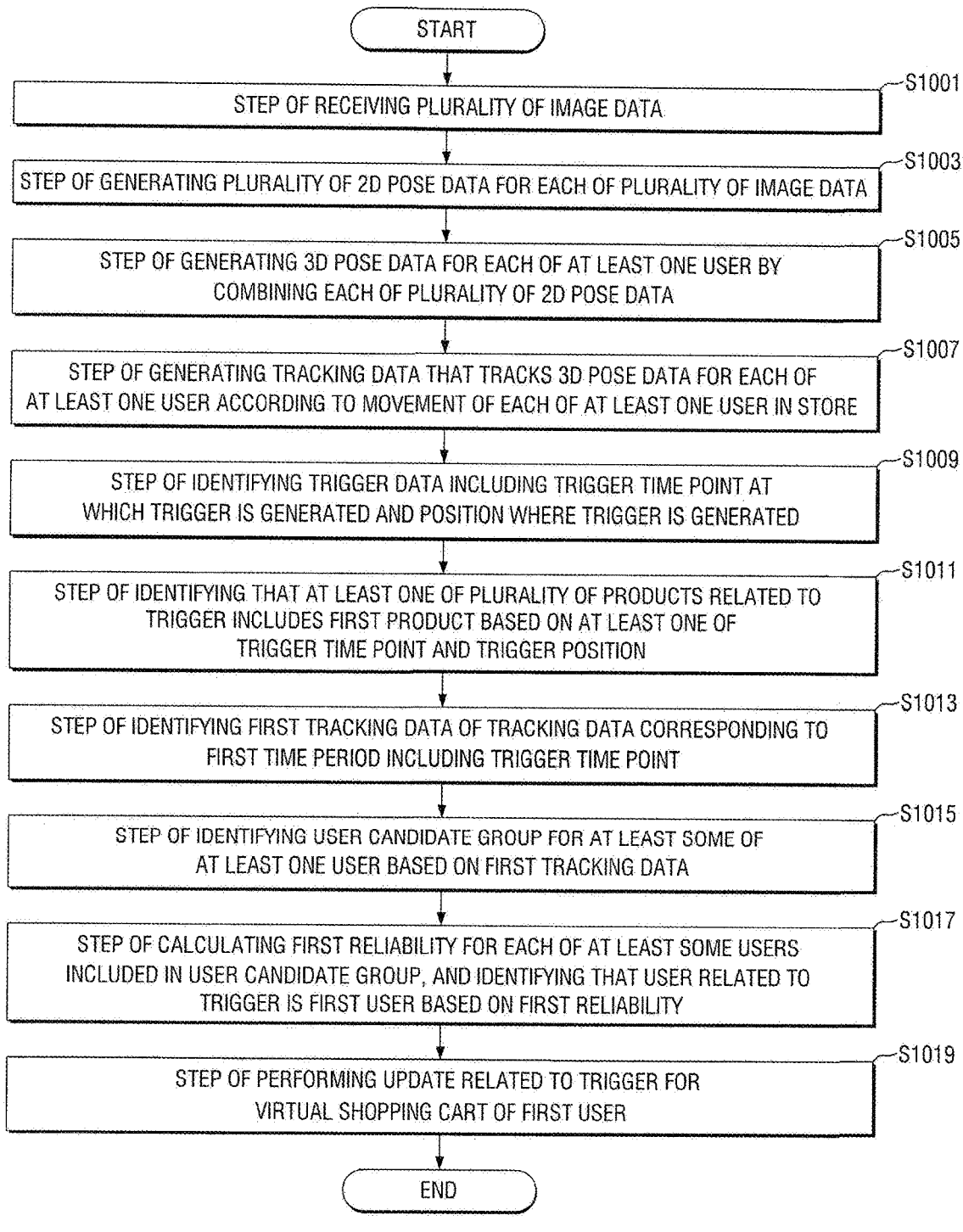

START

STEP OF RECEIVING PLURALITY OF IMAGE DATA  —S1001

STEP OF GENERATING PLURALITY OF 2D POSE DATA FOR EACH OF PLURALITY OF IMAGE DATA  —S1003

STEP OF GENERATING 3D POSE DATA FOR EACH OF AT LEAST ONE USER BY COMBINING EACH OF PLURALITY OF 2D POSE DATA  —S1005

STEP OF GENERATING TRACKING DATA THAT TRACKS 3D POSE DATA FOR EACH OF AT LEAST ONE USER ACCORDING TO MOVEMENT OF EACH OF AT LEAST ONE USER IN STORE  —S1007

STEP OF IDENTIFYING TRIGGER DATA INCLUDING TRIGGER TIME POINT AT WHICH TRIGGER IS GENERATED AND POSITION WHERE TRIGGER IS GENERATED  —S1009

STEP OF IDENTIFYING THAT AT LEAST ONE OF PLURALITY OF PRODUCTS RELATED TO TRIGGER INCLUDES FIRST PRODUCT BASED ON AT LEAST ONE OF TRIGGER TIME POINT AND TRIGGER POSITION  —S1011

STEP OF IDENTIFYING FIRST TRACKING DATA OF TRACKING DATA CORRESPONDING TO FIRST TIME PERIOD INCLUDING TRIGGER TIME POINT  —S1013

STEP OF IDENTIFYING USER CANDIDATE GROUP FOR AT LEAST SOME OF AT LEAST ONE USER BASED ON FIRST TRACKING DATA  —S1015

STEP OF CALCULATING FIRST RELIABILITY FOR EACH OF AT LEAST SOME USERS INCLUDED IN USER CANDIDATE GROUP, AND IDENTIFYING THAT USER RELATED TO TRIGGER IS FIRST USER BASED ON FIRST RELIABILITY  —S1017

STEP OF PERFORMING UPDATE RELATED TO TRIGGER FOR VIRTUAL SHOPPING CART OF FIRST USER  —S1019

END

ELECTRONIC DEVICE AND METHOD FOR PROVIDING STORE PAYMENT SERVICE

CROSS-REFERENCE TO RELATED APPLICATION

This application is based on and claims priority under 35 U.S.C. § 119 to Korean Patent Application No. 10-2023-0050004, filed on Apr. 17, 2023, in the Korean Intellectual Property Office, the disclosure of which is incorporated by reference herein in its entirety.

TECHNICAL FIELD

The disclosure relates to an electronic device and a method for providing store payment service, and more particularly, to an electronic device and a method for providing unmanned payment service in a store providing the unmanned payment service.

BACKGROUND

The contents described in this part merely provide background information about the present embodiment and do not constitute prior art.

Recently, as the number of unmanned stores increases, unmanned payment is essential. For unmanned payment, it is important to understand which user using a store wants to purchase which product.

In a case of understanding for identifying users and products by using a special camera (for example, LiDAR or depth camera) in order to understand which user wants to purchase which product, there may be a problem that the accuracy of the understanding may be low by relying only on an image obtained from the special camera, and it is not economical because high cost is required due to the special camera.

In addition, in a case of understanding for identifying users and products by using a general-purpose camera (for example, an RGB camera) in order to understand which user wants to purchase which product, it may be effective in terms of cost for the camera, but the accuracy of the result is low. Thus, there may be a case where a person needs to additionally check the determination result using a general camera because the accuracy the result is low.

Therefore, there is a need for a technology capable of improving the accuracy of the result of understanding for identifying which user wants to purchase which product while using a general-purpose camera.

The description set forth in the background section should not be assumed to be prior art merely because it is set forth in the background section. The background section may describe aspects or embodiments of the disclosure.

SUMMARY

One aspect of the disclosure provide an electronic device and a method for providing store payment service capable of improving the accuracy of a result of understanding for identifying which user wants to purchase which product in an unmanned store.

According to some aspects of the disclosure, electronic device for providing store payment service includes a processor, and a memory operatively coupled to the processor, wherein the memory, when executed, causes the processor to receive a plurality of image data from a plurality of image sensors in the store, generate a plurality of 2D pose data by estimating a joint position of each of at least one user and a posture of each of the at least one user for each of the plurality of image data based on that the at least one user is included in the plurality of image data, combine each of the plurality of 2D pose data to generate 3D pose data for each of the at least one user that matches each of the at least one user, and generate tracking data for tracking the 3D pose data for each of the at least one user according to a movement of each of the at least one user in the store, identify trigger data including a trigger time point at which a trigger, in which at least one of a plurality of products displayed in the store is removed from a shelf or added to the shelf, is generated, and a position where the trigger is generated, identify at least one of the plurality of products related to the trigger based on at least one of the trigger time point and the position where the trigger is generated, identify first tracking data of the tracking data corresponding to a first time period including the trigger time point, identify a user candidate group for at least some of the at least one user based on the first tracking data, calculate a first reliability for each of the at least some users included in the user candidate group, identify that a user related to the trigger is a first user based on the first reliability, and store instructions for performing an update related to the trigger for a virtual shopping cart of the first user.

According to some aspects, wherein the instructions cause the processor to identify shelf image data at the trigger time point as shelf image data for the shelf related to the trigger, identify product detection image data related to the user candidate group in the first time period, and cause at least one of the plurality of products related to the trigger to include a first product based on at least one of the shelf image data, the product detection image data, and the position where the trigger is generated.

According to some aspects, Wherein the instructions cause the processor to identify the first user using at least one of a first user identification method and a second user identification method, the first user identification method identifies the user candidate group based on whether the shelf related to the trigger is accessed on the basis of the first tracking data, and the second user identification method identifies first interaction information interacting with at least one of the plurality of products in the first tracking data, and identifies the user candidate group based on the first interaction information.

According to some aspects, wherein the instructions cause the processor to identify the trigger data further including a weight change detected by a first weight sensor of the first weight sensor connected to a first plate on which the first product is displayed and a second weight sensor connected to a second plate on which the second product is displayed on the shelf, and at least one of the plurality of products related to the trigger includes the first product based on at least one of the position of the first weight sensor which is the position where the trigger is generated, and shelf image data including an image of the first plate.

According to some aspects, wherein the instructions cause the processor to identify the trigger data further including at least one of a weight change detected by a weight sensor connected to the shelf including the first plate on which the first product is displayed and the second plate on which the second product is displayed, and second interaction information based on the plurality of image data, identify the user candidate group based on the first tracking data and the trigger data when the first user identification method is used, and identify the user candidate group based on the first interaction information including a result of identifying the type and the number of at least one of the plurality of products held by each of at least one user, and whether the type and the number of at least one of the plurality of products are changed when the second user identification method is used.

According to some aspects, wherein the shelf image data includes first shelf image data at the start of the second time period, and second shelf image data at the end of the second time period, the instructions cause the processor to identify the first product using at least one of a first product identification method and a second product identification method, the first product identification method estimates a product change position based on at least one of the weight change detected by the weight sensor and a comparison result between the first shelf image data and the second shelf image data, and calculates a second reliability for each of the first product and the second product based on the product change position and the weight change, and identifies that at least one of the plurality of products includes the first product based on the second reliability, and the second product identification method estimates whether the product is changed based on at least one of a result of identifying the type and the number of products held by each of the user candidate groups and the comparison result, on the basis of the product detection image data, calculates the second reliability for each of the first product and the second product based on whether the product is changed, and identifies that at least one of the plurality of products includes the first product based on the second reliability.

According to some aspects, wherein the instructions cause the processor to identify third interaction information including information about the interaction time point, the position where the interaction is generated, and the first user who is the subject of the interaction to identify a trigger further including the third interaction information based on the plurality of image data when an interaction is generated between the shelf and the at least some of at least one user, identify the user candidate group based on the third interaction information of the trigger data when the first user identification method is used, identify the first interaction information in the first tracking data based on the third interaction information when the second user identification method is used, and identify the user candidate group based on the first interaction information.

According to some aspects, wherein instructions cause the processor to identify the first product using at least one of a first product identification method and a second product identification method, the first product identification method estimates a product change position based on a comparison result between the first shelf image data at the start of the second time period and the second shelf image data at the end of the second time period, and identifies that at least one of the plurality of products related to the trigger includes the first product based on third shelf image data corresponding to the product change position and a time point at which the trigger is generated, and the second product identification method estimates whether a product is changed based on at least one of a result of identifying the type and the number of products held by each of the user candidate groups on the basis of the product detection image data and the comparison result, and calculates a second reliability for each of the first product and the second product based on whether the product is changed, and causes at least one of the plurality of products to include the first product based on the second reliability.

According to some aspects, wherein instructions cause the processor to determine whether there is a change in the plurality of products on the shelf based on at least one of shelf image data received from the plurality of image sensors, user image data including at least one user received from the plurality of image sensors, and weight data received from a weight sensor connected to the shelf, and determine validity of the trigger data based on the determination.

According to some aspects of the disclosure, method for providing store payment service includes receiving a plurality of image data from a plurality of image sensors in a store, generating a plurality of 2D pose data by estimating a joint position of each of at least one user and a posture of each of the at least one user for each of the plurality of image data based on that the at least one user is included in the plurality of image data, combining each of the plurality of 2D pose data to generate 3D pose data for each of the at least one user that matches each of the at least one user, and generate tracking data for tracking the 3D pose data for each of the at least one user according to a movement of each of the at least one user in the store, identifying trigger data including a trigger time point at which a trigger, in which at least one of a plurality of products displayed in the store is removed from a shelf or added to the shelf, is generated, and a position where the trigger is generated, identifying at least one of the plurality of products related to the trigger based on at least one of the trigger time point and the position where the trigger is generated, identifying first tracking data of the tracking data corresponding to a first time period including the trigger time point, identifying a user candidate group for at least some of the at least one user based on the first tracking data, calculating a first reliability for each of the at least some users included in the user candidate group, identifying that a user related to the trigger is a first user based on the first reliability and storing instructions for performing an update related to the trigger for a virtual shopping cart of the first user.

Aspects of the disclosure are not limited to those mentioned above, and other objects and advantages of the disclosure that have not been mentioned can be understood by the following description, and will be more clearly understood by embodiments of the disclosure. In addition, it will be readily understood that the objects and advantages of the disclosure can be realized by the means and combinations thereof set forth in the claims.

The electronic device and the method for providing store payment service of the present disclosure identify the user and the product of a purchase act based on a result of tracking the 3D pose data corresponding to the user in the store and the time point at which the trigger is generated, and thereby the accuracy of the result of identifying the user and the product the user wants to purchase may be improved, and the possibility of payment error may be reduced.

The electronic device and the method for providing store payment service of the present disclosure identify the user and the product of the purchase act based on a result of tracking the 3D pose data corresponding to the user in the store, a time point at which the trigger is generated, and data obtained from a weight sensor, and thereby the accuracy of the result of identifying the user and the product the user wants to purchase may be improved, and the possibility of payment error may be reduced.

In addition to the foregoing, the specific effects of the disclosure will be described together while elucidating the specific details for carrying out the embodiments below.

BRIEF DESCRIPTION OF THE DRAWINGS

FIG. 2 is a flowchart illustrating an operation of an electronic device for providing store payment service according to some embodiments of the present disclosure.

FIG. 17 is a flowchart illustrating a method for providing store payment service according to some embodiments of the present disclosure.

DETAILED DESCRIPTION OF THE PREFERRED EMBODIMENTS

Figure 1:
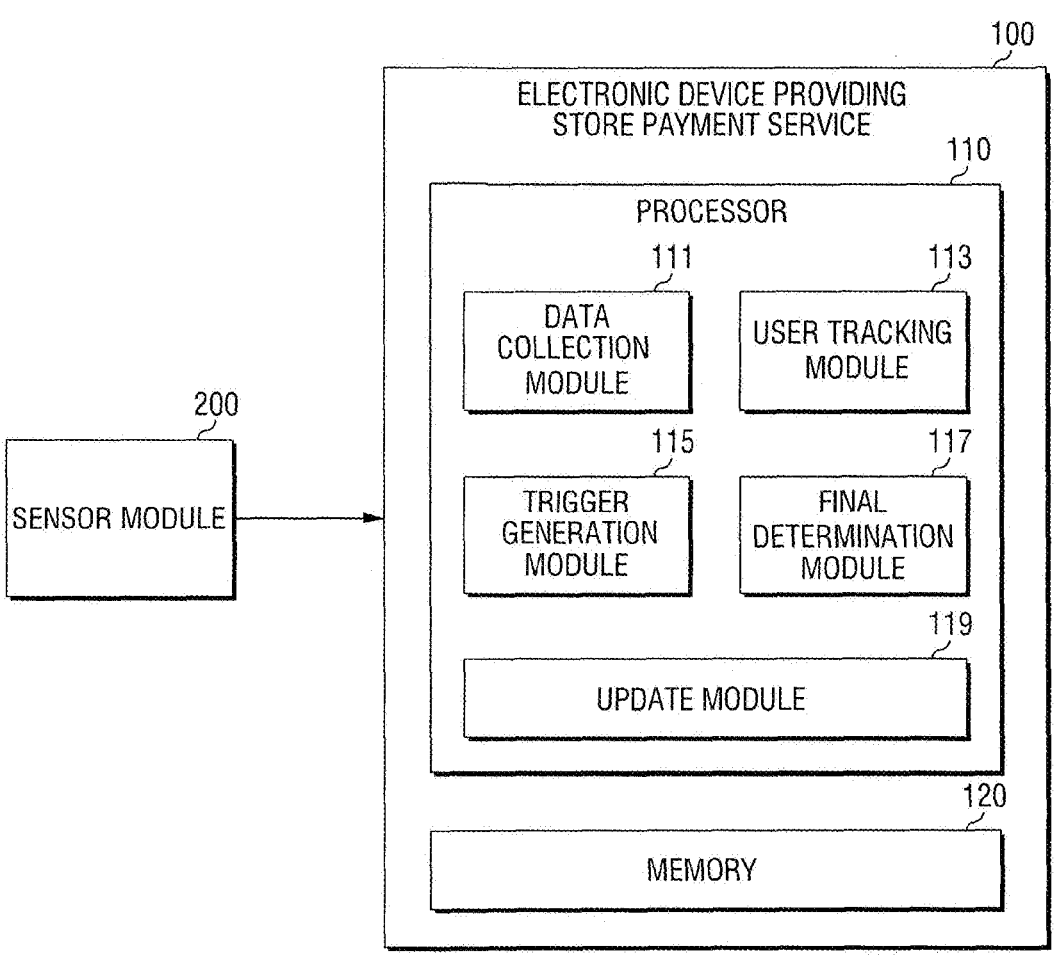
FIG. 1 is a diagram for explaining an electronic device for providing store payment service according to some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C." or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, an electronic device for providing store payment service according to an embodiment of the present disclosure will be described with reference to FIGS. 1 to 6B.

FIG. 1 is a diagram for explaining the electronic device for providing store payment service according to some embodiments of the present disclosure.

Referring to FIG. 1, an electronic device 100 providing store payment service according to some embodiments of the present disclosure may include a processor 110 and a memory 120.

One or more other components (for example, a communication module) may be added to the electronic device 100 providing store payment service. In some embodiments, some of these components may be implemented as a single integrated circuit.

The electronic device 100 providing store payment service may communicate with a sensor module 200. The sensor module 200 may be installed in a store. The sensor module 200 may include at least one type of sensor. For example, the sensor module 200 may include at least one image sensor and at least one weight sensor installed in the store.

The memory 120 may store various data used by at least one component (for example, the processor 110) of the electronic device 100 providing store payment service. Data may include, for example, input data or output data for software and related instructions. The memory 120 may include volatile memory or non-volatile memory.

The memory 120 may store commands, information, or data related to operations of the components included in the electronic device 100 providing store payment service. For example, the memory 120 may store instructions that, when executed, enable the processor 110 to perform various operations described herein.

The processor 110 may be operatively coupled to the memory 120 in order to perform overall functions of the electronic device 100 providing store payment service. The processor 110 may include, for example, one or more processors. The one or more processors may include, for example, an image signal processor (ISP), an application processor (AP), or a communication processor (CP).

The processor 110 may control, for example, at least one of the other components (for example, hardware or software component) of the electronic device 100 providing store payment service connected to the processor 110, and perform various data processing or calculations by executing software (for example, a program). According to one embodiment, as at least part of data processing or calculation, the processor 110 may load commands or data received from other components (for example, the sensor module 200 or communication module) into the memory 120, process the commands or data stored in the memory 120, and store resultant data in the memory 120. The program may be stored as software in memory 120.

The processor 110 may include a data collection module 111, a user tracking module 113, a trigger generation module 115, a final determination module 117, and an update module 119. Some of these components may be implemented as a single integrated circuit. In addition, of course, any one of the modules included in the processor 110 (for example, the data collection module 111) may be implemented in a separate circuit (for example, communication module) or included in another circuit (for example, communication module).

Figure 3:
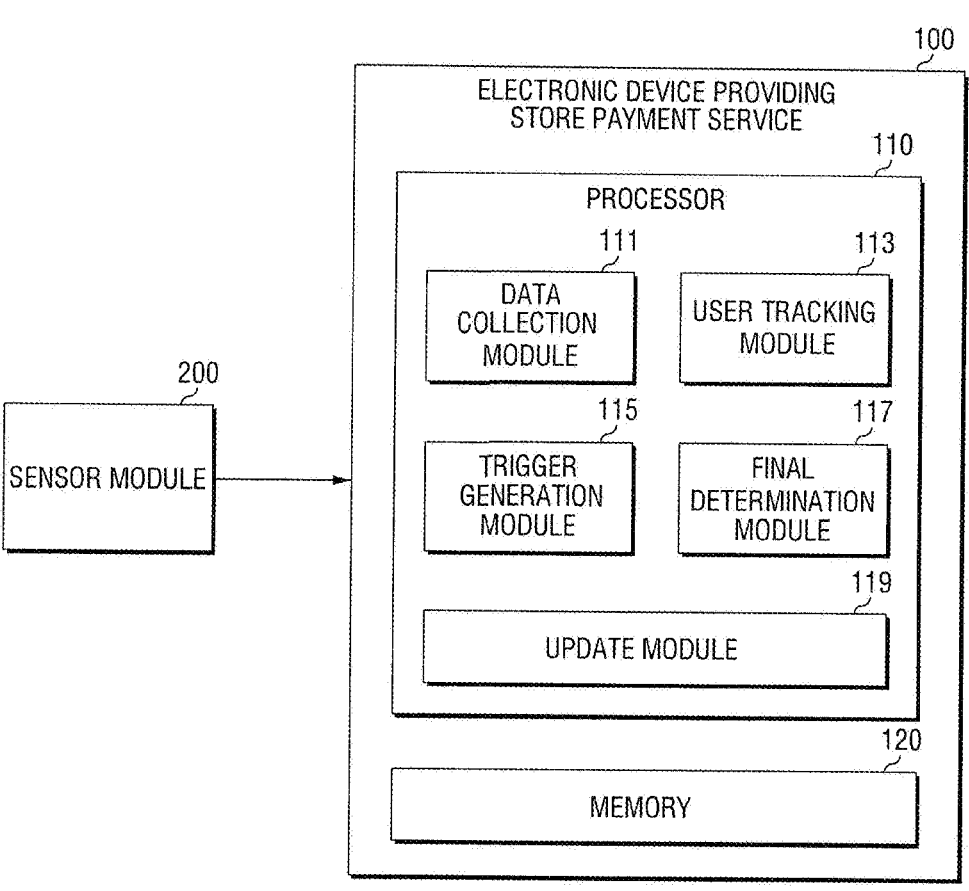
FIG. 3 is a flowchart for explaining operations S103 and S105 of FIG. 2.
Figure 4A:
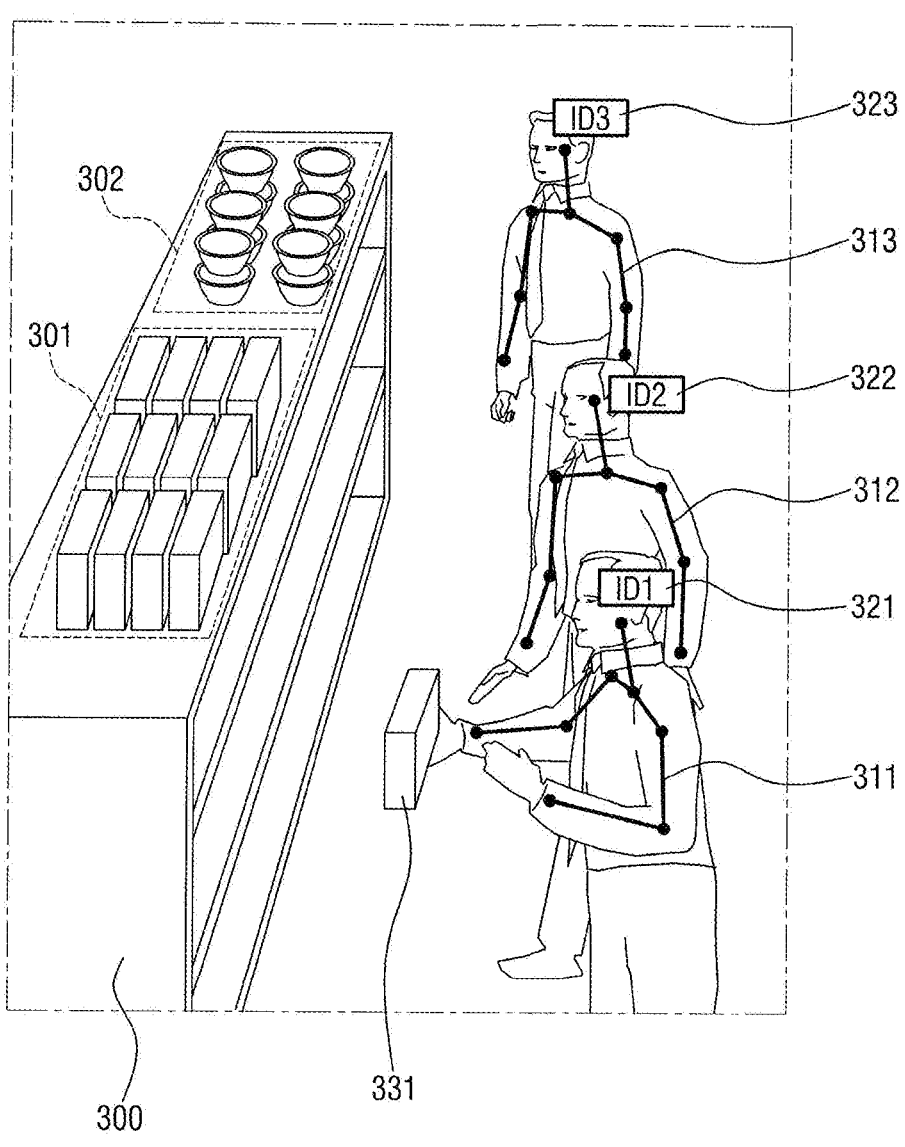
FIGS. 4A and 4B are drawings for explaining an operation of an electronic device for providing store payment service according to some embodiments of the present disclosure.
Figure 4B:
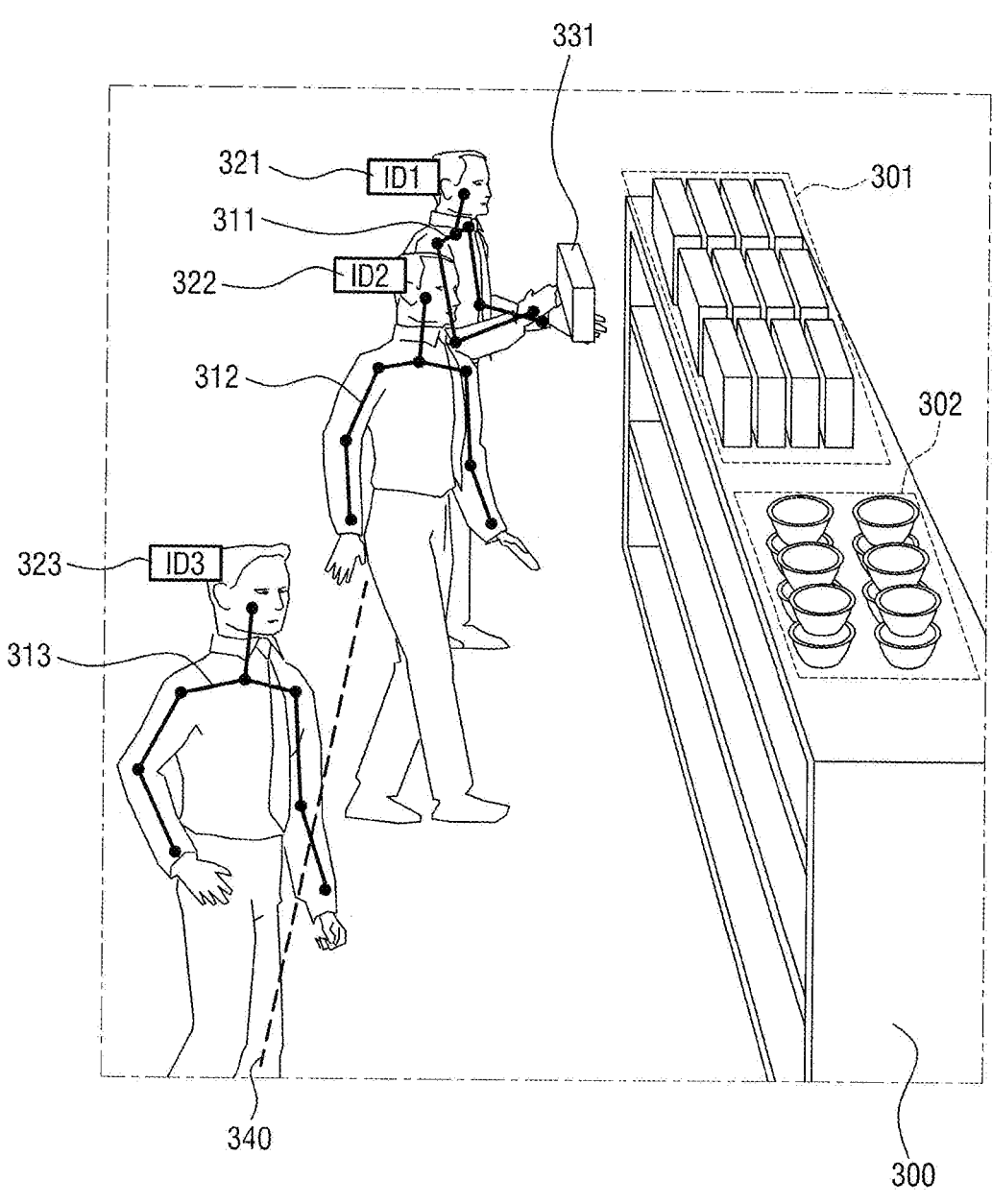
Figure 5:
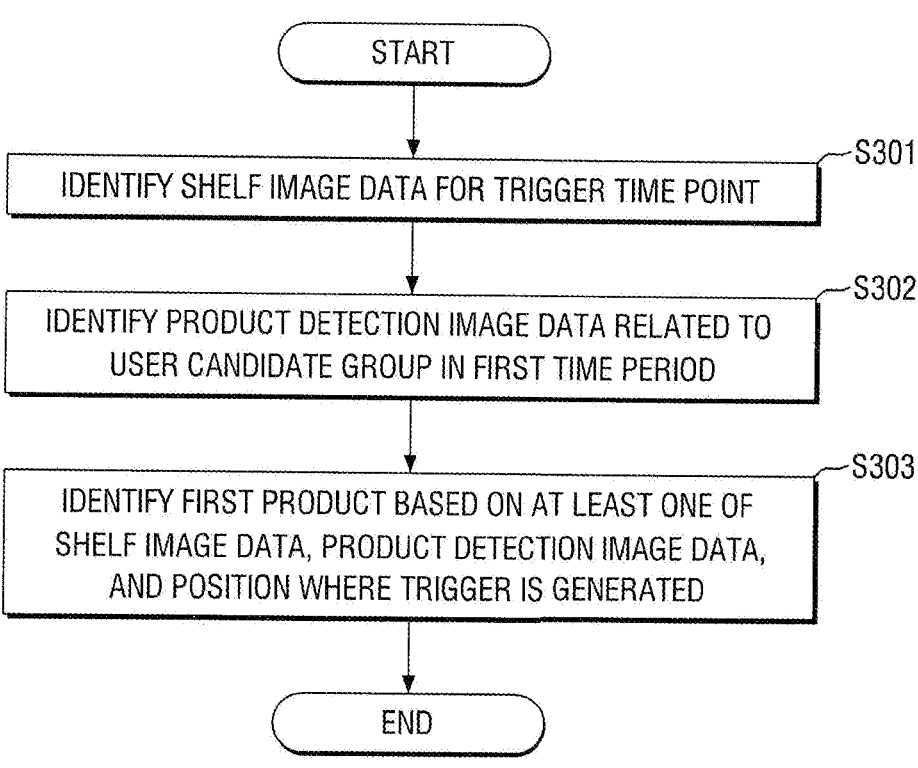
FIG. 5 is a flowchart for explaining operation S109 of FIG. 2.
Figure 6A:
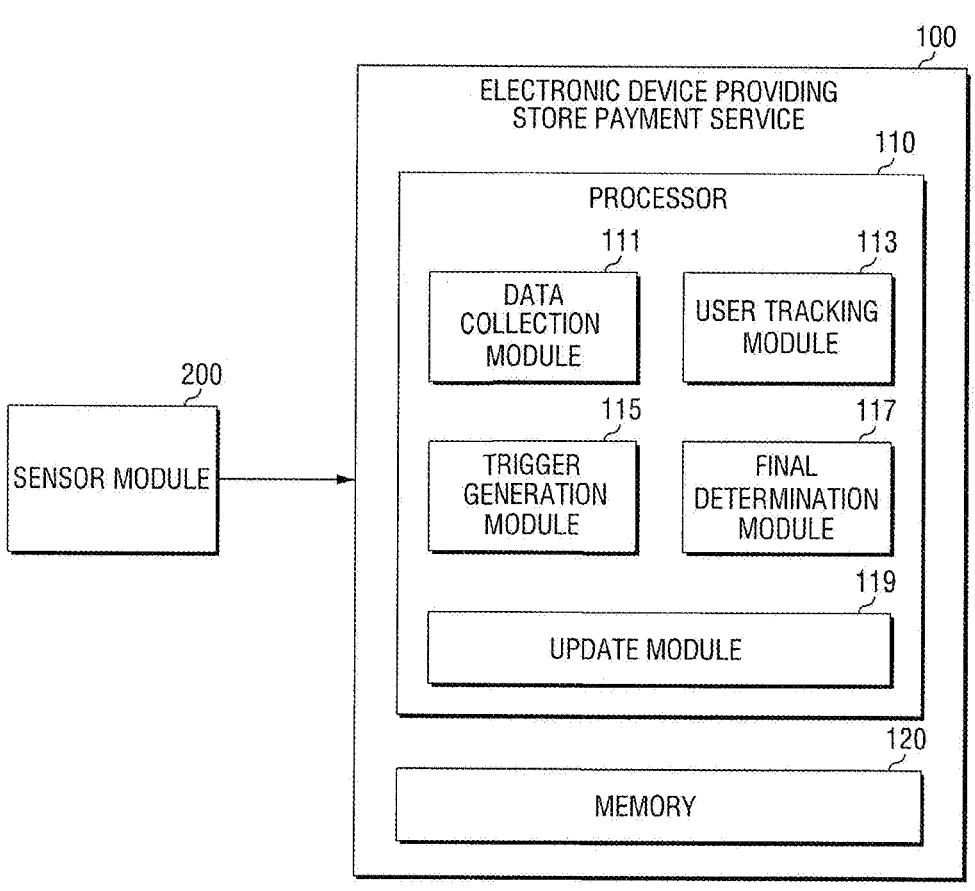
FIGS. 6A and 6B are flowcharts for explaining operations S111 and S113 of FIG. 2.
Figure 6B:
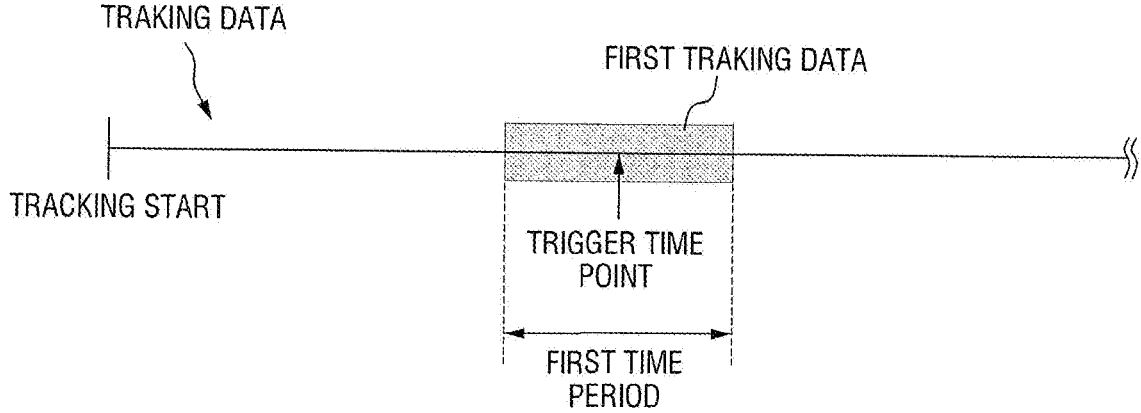

Hereinafter, operations of the modules included in the processor 110 will be described in detail with reference to FIGS. 2 to 6B. FIG. 2 is a flowchart for explaining an operation of the electronic device for providing store payment service according to some embodiments of the present disclosure. FIG. 3 is a flowchart for explaining operations S103 and S105 of FIG. 2. FIGS. 4A and 4B are drawings for explaining the operation of the electronic device for providing store payment service according to some embodiments of the present disclosure. FIG. 5 is a flowchart for explaining operation S109 of FIG. 2. FIGS. 6A and 6B are flowcharts for explaining operations S111 and S113 of FIG. 2.

Referring to FIGS. 1 and 2, the processor 110 (for example, the data collection module 111) may receive a plurality of image data from a plurality of image sensors at S101.

The plurality of image sensors may be included in the sensor module 200. Each of the plurality of image sensors may be installed in different directions and/or at different angles in the store. Also, each of the plurality of image sensors may generate a plurality of image data obtained by photographing different predetermined regions in different directions and/or at different angles in the store.

The plurality of image data received from the plurality of image sensors may include at least one user in the store. In some cases, the plurality of image data may include not only at least one user, but also shelves and a plurality of products displayed on the shelves in the store.

The processor 110 (for example, the user tracking module 113) may generate 3D pose data based on the inclusion of at least one user in the plurality of image data at S103. The processor 110 (for example, the user tracking module 113) may generate tracking data for tracking the 3D pose data at S105.

Referring to FIGS. 1, 2, and 3, the processor 110 (for example, the user tracking module 113) may generate tracking data first at S201 to generate the 3D pose data at S103 and generate the tracking data at S105.

The processor 110 may identify at least one user for each of the plurality of image data. For example, the processor 110 may identify a first user, a second user, and a third user as at least one user in the store.

The processor 110 may generate a plurality of 2D pose data estimating the joint position of each of at least one user and each posture of at least one user. For example, the processor 110 may generate the plurality of 2D pose data corresponding to each of the plurality of image data by estimate each ossf the joint position and posture of the at least one user included in each of the plurality of image data.

For example, the processor 110 may generate first 2D pose data by estimating the joint position and the posture of each of the first user, the second user, and the third user included in the first image data among the plurality of image data. In addition, the processor 110 may generate second 2D pose data by estimating the joint position and the posture of each of the first to third users included in the second image data among the plurality of image data. The plurality of 2D pose data may include first 2D pose data and second 2D pose data. In this way, the processor 110 may generate the plurality of 2D pose data corresponding to each of the plurality of image data.

The processor 110 (for example, the user tracking module 113) may generate the 3D pose data for each of at least one user based on the plurality of 2D pose data at S203.

The processor 110 may combine the plurality of 2D pose data, respectively, to generate the 3D pose data that matches each of at least one user. The 3D pose data may be generated for each of at least one user.

For example, the processor 110 may combine the joint position and posture estimation results of the first user identified in each of the first 2D pose data and the 2D second pose data, respectively, to generate the 3D pose data for the first user. In addition, the processor 110 may combine the joint position and posture estimation results of the second user identified in each of the first 2D pose data and the second 2D pose data, respectively, to generate the 3D pose data for the second user. In addition, the processor 110 may combine the joint position and posture estimation results of the third user identified in each of the first 2D pose data and the second 2D pose data, respectively, to generate the 3D pose data for the third user.

The processor 110 (for example, the user tracking module 113) may generate tracking data for tracking the 3D pose data at S205. Generating the 3D pose data at S203 and tracking the 3D pose data at S205 may be performed simultaneously. That is, the processor 110 may generate the tracking data for tracking the 3D pose data by generating the 3D pose data.

The processor 110 may generate the tracking data tracking the 3D pose data generated for each of at least one user according to the movement of each of at least one user in the store.

Referring to FIGS. 4A and 4B, the tracking data may include the result of tracking, according to the lapse of time, the 3D pose data 311 of the first user, the 3D pose data 312 of the second user, and the 3D pose data 313 of the third user in the store. The processor 110 may receive image data acquired at various angles and directions from the sensor module 200 at the same time, and the image data may include the 3D pose data.

The processor 110 may set an ID for the 3D pose data for each of at least one user. For example, in the tracking data, the first user may be identified as the first ID 321, the second user may be identified as the second ID 322, and the third user may be identified as the third ID 323. The processor 110 may generate the tracking data by tracking the ID for each of at least one user and the 3D pose data associated with the ID in the store according to the lapse of time.

The tracking data may include information about movement of the 3D pose data in the store and time information. For example, the tracking data may include a result of tracking the 3D pose data 311 of the first user in the store according to the lapse of time, and the processor 110 may identify whether the first user takes which posture with respect to the shelf 300 based on the tracking data at a specific time point (for example, the trigger time point), or whether the first user holds a product based on the posture the first user at a specific time point (for example, the trigger time point).

Referring to FIGS. 1 and 2, the processor 110 (for example, the trigger generation module 115) may identify the trigger data including a trigger time and a position where the trigger is generated at S107.

The trigger may be, for example, an event in which at least one of a plurality of products displayed in the store is removed from the shelf or added to the shelf.

Referring to FIG. 4A, an event that the first user picks up a first product 331 from a first product group 301 displayed on a shelf 300 and the first product 331 is removed from the shelf 300 may call a trigger. Based on the generation of the trigger, the processor 110 may identify trigger data including a time point at which the trigger is generated and a position where the trigger is generated.

The trigger may be identified, for example, by the sensor module 200. For example, the processor 110 may identify that a trigger indicating that a certain user has picked up a certain product has occurred based on image data obtained from an image sensor of the sensor module 200. For example, the processor 110 may identify that a trigger indicating that a certain user has picked up a certain product has occurred based on a weight change obtained from a weight sensor of the sensor module 200.

In some embodiments, the processor 110 may determine validity of the trigger data. The processor 110 may determine whether there is a change in a plurality of products on the shelf based on at least one of shelf image data received from a plurality of image sensors, user image data including at least one user received from the plurality of image sensors, and weight data received from the weight sensor connected to the shelf. The processor 110 may determine validity of the trigger data based on the determination result. For example, the processor 110 may determine that the trigger data is invalid in a case where a certain user touches a product displayed on the shelf and a change is detected by the weight sensor, but the product is not added to or removed from the shelf so that no actual trigger occurs.

Referring to FIGS. 1 and 2, the processor 110 (for example, the final determination module 117) may identify the first product based on the trigger data at S109.

The processor 110 may identify that at least one of a plurality of products related to the trigger includes the first product, based on at least one of the trigger time and the trigger position.

Referring to FIG. 5, the processor 110 (for example, the final determination module 117) may identify that at least one of the plurality of products related to the trigger includes the first product, based on at least one of shelf image data, product detection image data, and a position where the trigger occurs at the trigger time point at S301, S302, and S303.

For example, in order to identify the product related to the trigger, the processor 110 may identify that at least one of the plurality of products related to the trigger includes the first product by using image processing on shelf image data at the trigger time point. In a case of identifying a product based on the shelf image data, the processor 110 may first identify the shelf image data at S301.

The shelf image data is image data for the shelf related to the trigger among a plurality of shelves installed in the store, and may be shelf image data at the trigger time point. For example, as shown in FIG. 4A, the shelf image data for the shelf 300 photographed at the time point at which the trigger for picking up the first product 331 from the shelf 300 by the first user may be generated from the sensor module 200. The processor 110 is related to the trigger and may receive the shelf image data from the sensor module 200 at the trigger time point.

The processor 110 uses, for example, an image processing method (for example, at least one of object detection, image segmentation, and image classification) for the shelf image data, and thereby may be identify that a certain user picks up the first product 331 from the shelf 300 or places the first product 331 back on the shelf 300.

As another example, the processor 110 may identify that at least one of the plurality of products includes the first product based on the product detection image data. The product detection image data may be, for example, related to a user candidate group. The processor 110 may identify the user candidate group for at least some of at least one user based on the first tracking data to be described later. The processor 110 may estimate whether a product has changed based on a result of identifying the type and the number of products held by each user candidate group based on the product detection image data. The processor 110 may calculate the reliability of the product based on whether the product has changed, and identify that at least one of the plurality of products includes the first product based on the calculated reliability. The processor 110 may perform the determination to estimate whether the product has changed further based on a comparison result between the first shelf image data and the second shelf image data to be described later.

As another example, the processor 110 may identify that at least one of the plurality of products related to the trigger includes the first product by identifying the product displayed on the shelf corresponding to the position based on the position where the trigger is generated. In a case of identifying that at least one of the plurality of products related to the trigger includes the first product based on the position where the trigger is generated, the processor 110 may identify the first product by identifying the product displayed on the shelf corresponding to the position where the trigger is generated based on information about the previously stored product display position.

As another example, the processor 110 may identify that at least one of the plurality of products related to the trigger includes the first product, based on all of the shelf image data, the product detection image data, and the position where the trigger is generated.

In some embodiments, the processor 110 may calculate the reliability of the result of identifying the product based on the shelf image data, the reliability of the result of identifying the product based on the product detection image data, and the reliability of the result of identifying the product based on the position where the trigger has occurred. Thus, the reliability of the product identified result may be calculated. The processor 110 may identify that at least one of the plurality of products related to the trigger includes the first product based on a result of calculating the highest reliability, based on each calculated reliability.

Referring to FIGS. 1 and 2, the processor 110 (for example, the final determination module 117) may identify the first tracking data at S111. The processor 110 (for example, the final determination module 117) may identify the first user based on the first tracking data at S113. Steps at S109, S301, S302, and S303 that the processor 110 identifies at least one of the plurality of products, and steps at S111, S113, and S115 that the processor 110 identifies the first user may be performed simultaneously or sequentially.

Referring to FIGS. 1, 2, 4A, 4B, 6A, and 6B, the processor 110 (for example, the final determination module 117) may identify the first tracking data of the tracking data corresponding to a first time period including the trigger time point at S401.

The first tracking data may be part of the tracking data. The first tracking data may be part of tracking data in the first time period including a certain time before the trigger time point and a certain time after the trigger time point.

The processor 110 (for example, the final determination module 117) may identify the first user using at least one of the first user identification method and the second user identification method. The processor 110 may identify at least some of at least one user as a user candidate group based on the first tracking data.

For example, the processor 110 may use at least one of the first user identification method and the second user identification method to identify the first user and the second user of at least one user (for example, the first user, the second user, and the third user) as the user candidate group.

When using the first user identification method, the processor 110 (for example, the final determination module 117) may identify the user candidate group based on whether the shelf 300 related to the trigger has been accessed based on the first tracking data at S403. The shelf 300 related to the trigger may be a shelf corresponding to a position where the trigger is generated among a plurality of shelves installed in the store. The processor 110 may set a boundary 340 to an area separated by a predetermined distance from the shelf 300, and identify at least some users (for example, the first user and the second user) located within the boundary 340 in the first tracking data to be determined as the user candidate group. As another example, the processor 110 may determine the user candidate group by identifying a user who has reached out to the shelf 300 in the first tracking data.

In a case of using the second user identification method, the processor 110 (for example, the final determination module 117) may first identify first interaction information that has interacted with at least one of the plurality of products from the first tracking data at S405. At least one of the plurality of products may be the first product in a case where product identification is performed first. Alternatively, at least one of the plurality of products may include all products for which the interaction has generated with a certain user among the plurality of products before the product identification is performed. The processor 110 may identify that an interaction of picking up at least one of the plurality of products from the shelf 300 or putting it on the shelf 300 has generated in the first tracking data, and generate the first interaction information.

The first interaction information may include, for example, at least one of information about a user who has interacted with at least one of the plurality of products, an interaction time point, and an interaction position. The first interaction information may include, for example, a result of identifying the type and the number of at least one of the plurality of products held by each of at least one user. The first interaction information may include, for example, whether the type and the number of at least one of the plurality of products held by each of at least one user has changed.

The processor 110 (for example, the final determination module 117) may identify the user candidate group based on the first interaction information at S407. Based on the first interaction information, the processor 110 may identify the user candidate group by identifying a change in the type and/or the number of products held by at least one user in the first tracking data. For example, the processor 110 may include the first user in the user candidate group based on information (that is, the first interaction information) that the first user holds the first product 331 in the first tracking data. If the second user also interacts with the first product 331 (for example, picks up the first product 331 or puts it on the shelf 300 again), the processor 110 may also include the second user in the user candidate group together with the first user.

After identifying the user candidate group, the processor 110 (for example, the final determination module 117) may calculate the first reliability for each of at least some users included in the user candidate group at S409. For example, in a case where the first user and the second user are included in the user candidate group, the processor 110 may calculate a reliability for a probability that the first user is a user related to the trigger of the first product 331, and calculate a reliability for a probability that the second user is a user related to the trigger of the first product 331. The first reliability may include the reliability for the probability that the first user is a user related to the trigger of the first product 331 and the reliability for the probability that the second user is a user related to the trigger of the first product 331.

The reliability may be calculated, for example, for each of at least some users included in the user candidate group for each frame of the first tracking data. For example, the reliability of a specific frame may be calculated based on at least one of whether how close the frame of the first tracking data corresponding to the trigger time point and the specific frame are, the distance between users included in the user candidate group, and the distance between each user of the user candidate group and the first product 331. For example, in FIG. 4B, the reliability for the first user may be calculated higher than that for the second user.

The processor 110 (for example, the final determination module 117) may identify that the user related to the trigger is the first user based on the first reliability at S411. For example, the processor 110 may identify that the first user is the user related to the trigger, based on the fact that the reliability for the first user is calculated higher than that for the second user in FIG. 4B. In other words, the processor 110 may identify that the first user is the user who picks up the first product 331 from the shelf 300.

Referring to FIGS. 1 and 2, the processor 110 (for example, the final determination module 117) may perform an update related to the trigger for a virtual shopping cart of the first user at S115. The processor 110 may update the virtual shopping cart of the first user based on the determination that the generation of the trigger relates to the first user and the first product. For example, in a case of the trigger in that the first product is removed from the shelf, the processor 110 may perform an update to add the first product to the virtual shopping cart of the first user. For example, in a case of the trigger in that the first product is added to the shelf, the processor 110 may perform an update to remove the first product from the virtual shopping cart of the first user.

Hereinafter, an electronic device for providing store payment service according to an embodiment of the present disclosure will be described with reference to FIGS. 7, 8, and 9. For clarity of explanation, duplicates with those described above are omitted.

Figure 7:
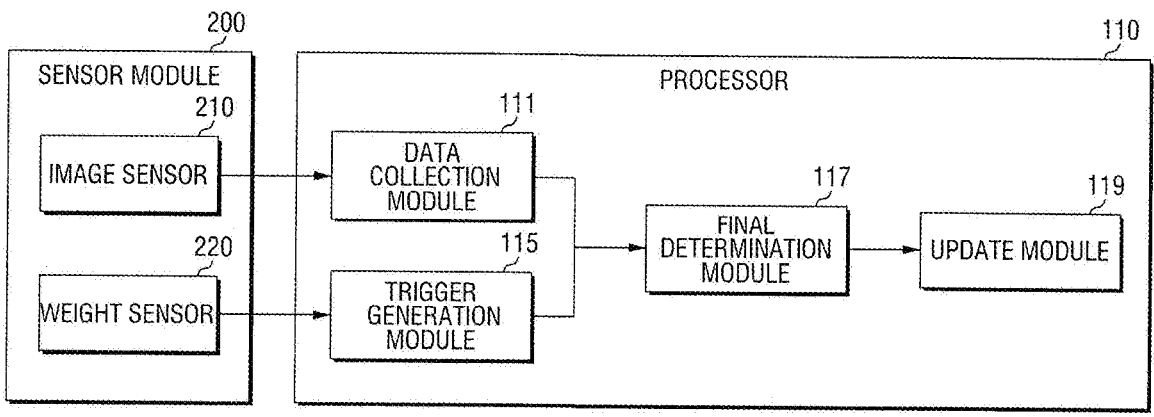
FIG. 7 is a diagram for explaining an electronic device for providing store payment service according to some embodiments of the present disclosure.

FIG. 7 is a diagram for explaining the electronic device for providing store payment service according to some embodiments of the present disclosure. FIG. 8 is a diagram for explaining an electronic device for providing store payment service according to some embodiments of the present disclosure. FIG. 9 is a flowchart for explaining an electronic device for providing store payment service according to some embodiments of the present disclosure.

Figure 8:
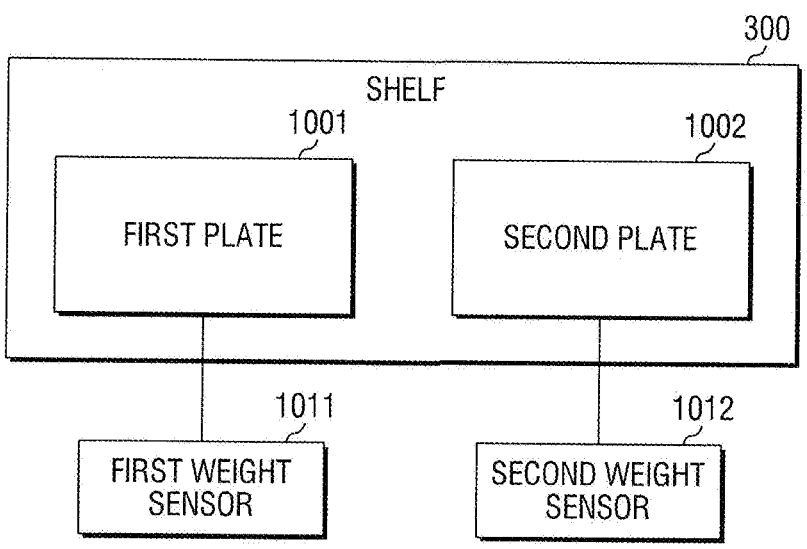
FIG. 8 is a diagram for explaining an electronic device for providing store payment service according to some embodiments of the present disclosure.
Figure 9:
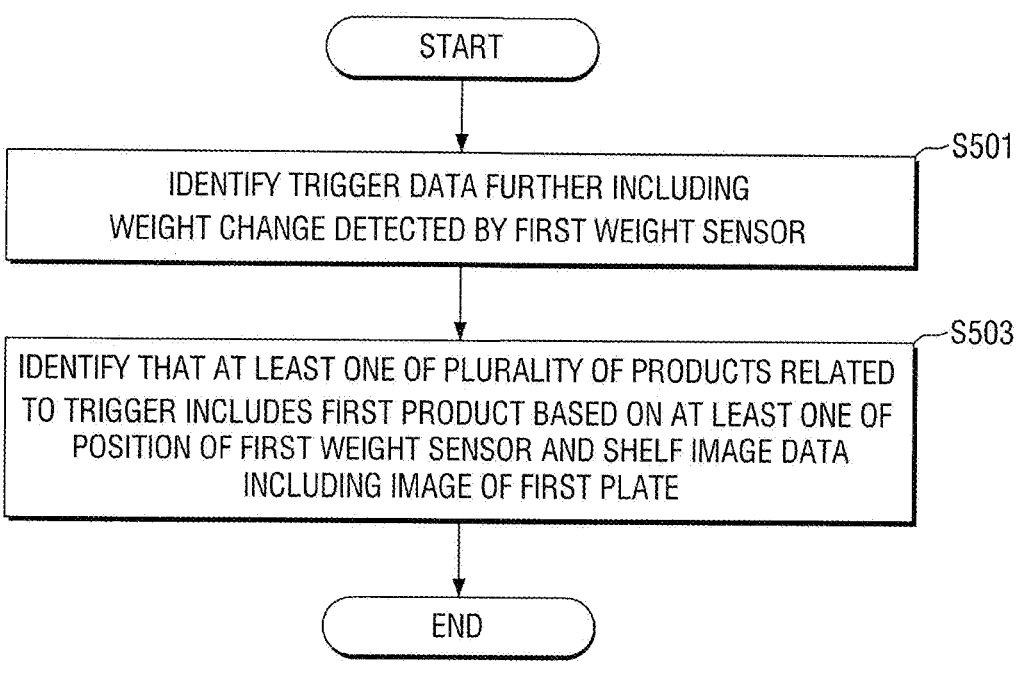
FIG. 9 is a flowchart for explaining an electronic device for providing store payment service according to some embodiments of the present disclosure.

Referring to FIGS. 7, 8 and 9, the processor 110 of the electronic device (100 in FIG. 1) for providing store payment service may receive data from each of the image sensor 210 and the weight sensor 220 of the sensor module 200. The image sensor 210 and the weight sensor 220 may be installed in the store. The image sensor 210 may generate image data obtained by photographing the plurality of shelves including the shelf 300 in the store at various angles and directions. The weight sensor 220 may be connected to a plate of the shelf 300 to detect a change in weight of the plate. The weight sensor 220 may include, for example, a first weight sensor 1011 and a second weight sensor 1012.

For example, the shelf 300 in the store may include a first plate 1001 and a second plate 1002. A plurality of products may be displayed on each of the first plate 1001 and the second plate 1002. The first plate 1001 may be connected to the first weight sensor 1011, and the second plate 1002 may be connected to the second weight sensor 1012. In the drawing, it is shown that one weight sensor is connected to one plate, but is not limited thereto. For example, a plurality of weight sensors may be connected to one plate.

Information about which product is displayed on which plate of the shelf in the store may be stored in advance. For example, information indicating that the first product is displayed on the first plate 1001 and the second product is displayed on the second plate 1002 may be previously stored information.

The processor 110 (for example, the data collection module 111) may receive shelf image data including an image of the first plate 1001 from the image sensor 210. Of course, the processor 110 may receive shelf image data including images of other plates from the image sensor 210. The shelf image data may be image data for the shelf 300 where the first weight sensor 1011 with which the weight change is detected is located.

The processor 110 (for example, the trigger generation module 115) may receive the weight change information of the first plate 1001 detected by the first weight sensor 1011 from the weight sensor 220, and the weight change information may be further included in the trigger data at S501. For example, the trigger data at S107 described with reference to FIG. 2 may further include the weight change information. For example, the trigger data may include the time point at which the trigger is generated, the position where the trigger is generated, and the weight change information indicating that the weight of the first plate 1001 has changed.

The processor 110 (for example, the final determination module 117) may identify that at least one of the plurality of products related to the trigger includes the first product based on at least one of the shelf image data including the image of the first plate and the position of the first weight sensor (that is, the position where the trigger is generated) at S503. For example, the shelf image data S301 described with reference to FIG. 5 may be obtained by identifying the shelf related to the trigger based on the position of the first weight sensor.

For example, the processor 110 may identify that the product related to the trigger is the first product based on the position of the first weight sensor where the weight change occurs (that is, the position where the trigger is generated). The processor 110 may identify that the weight change is detected on the first plate 1001 based on the weight change information included in the trigger data, and identify that the product related to the trigger is the first product based on previously stored information that the first product is displayed on the first plate 1001.

As another example, the processor 110 may identify that at least one of the plurality of products related to the trigger includes the first product by using image processing for the shelf image data including the image of the first plate 1001 at the trigger time point, based on identifying that the position where the trigger is generated is the first plate 1001 on the basis of the weight change information of the trigger data.

If the first product is incorrectly displayed on the second plate 1002 instead of the first plate 1001, when the user picks up the first product from the second plate 1002, the processor 110 may identify the second product other than the first product as at least one of the plurality of products related to the trigger on the basis of the weight change information. In this case, if the product is identified further based on the shelf image data, the reliability for the product identified by the processor 110 may be improved.

The processor 110 (for example, the final determination module 117) may identify the user related to the trigger as described with reference to operations S111 and S113 of FIG. 2.

Hereinafter, an electronic device for providing store payment service according to an embodiment of the present disclosure will be described with reference to FIGS. 10 to 13B. For clarity of explanation, duplicates with those described above are omitted.

Figure 10:
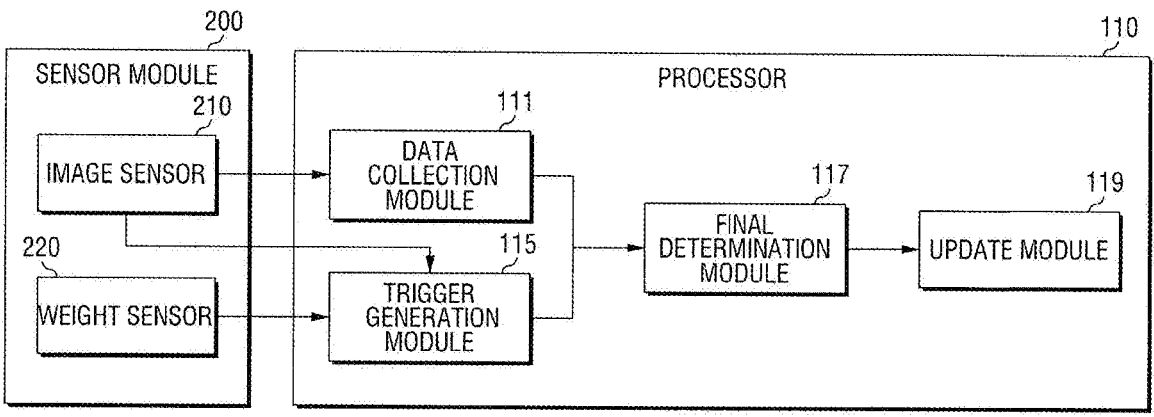
FIG. 10 is a diagram for explaining an electronic device for providing store payment service according to some embodiments of the present disclosure.
Figure 11:
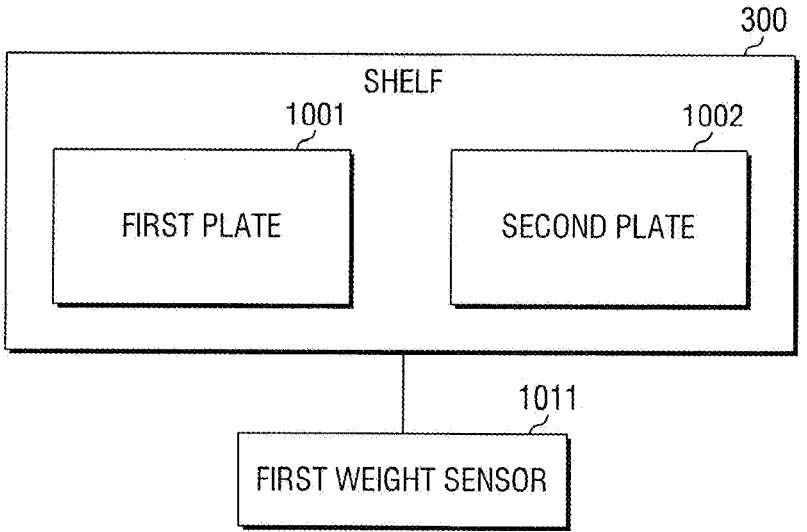
FIG. 11 is a diagram for explaining an electronic device for providing store payment service according to some embodiments of the present disclosure.
Figure 12:
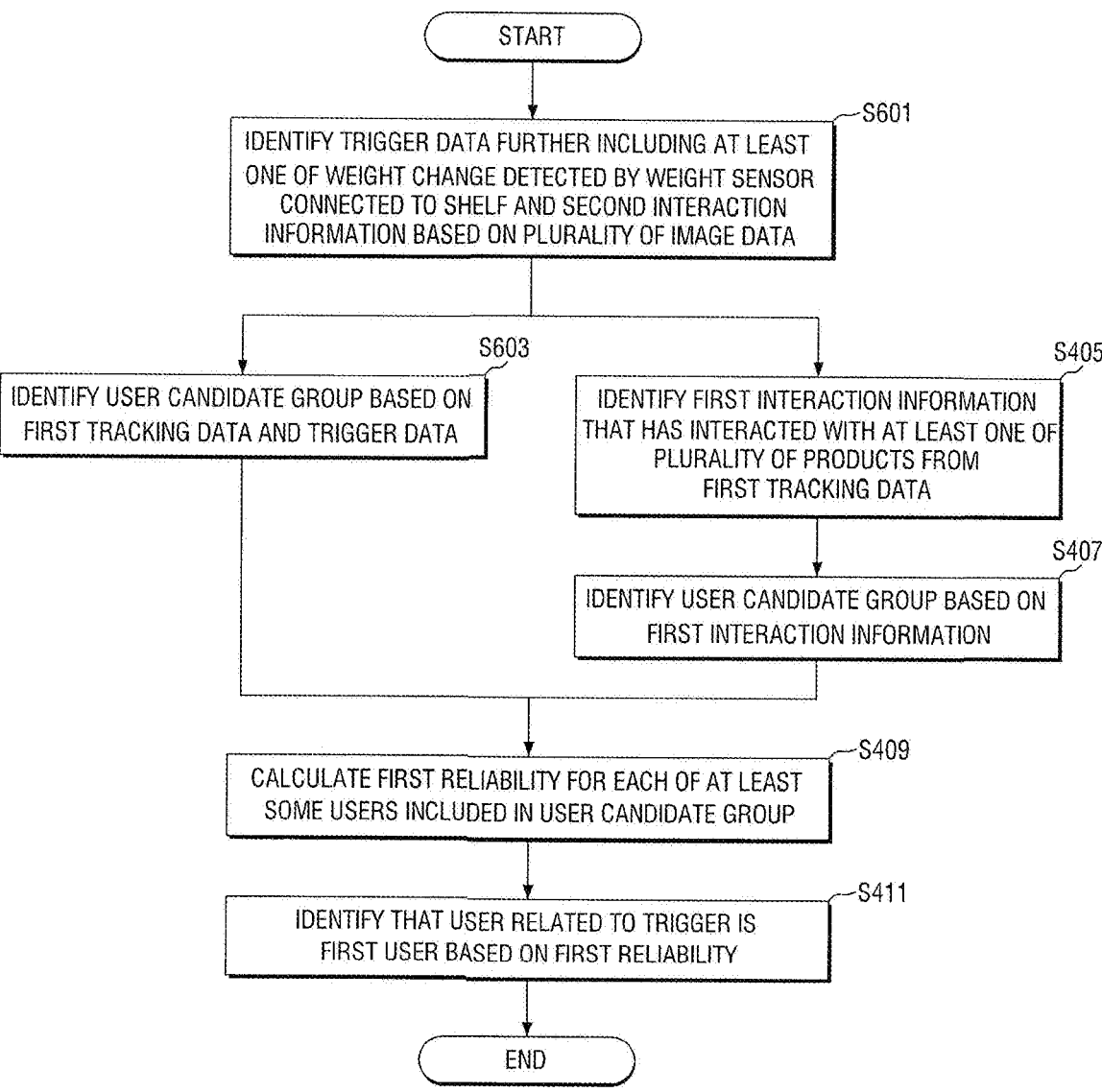
FIGS. 12 and 13 are flowcharts for explaining an electronic device for providing store payment service according to some embodiments of the present disclosure.
Figure 13B:
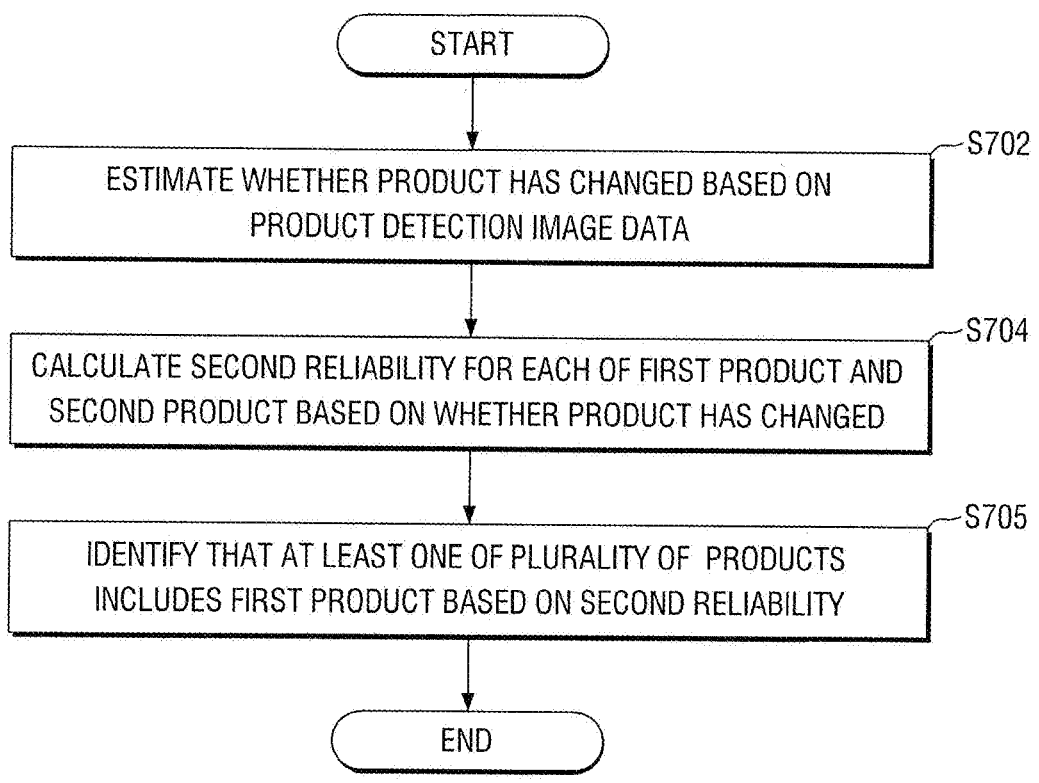

FIG. 10 is a diagram for explaining an electronic device for providing store payment service according to some embodiments of the present disclosure. FIG. 11 is a diagram for explaining an electronic device for providing store payment service according to some embodiments of the present disclosure. FIGS. 12, 13A, and 13B are flowcharts for explaining an electronic device for providing store payment service according to some embodiments of the present disclosure.

Referring to FIGS. 10 and 11, the processor 110 of the electronic device (100 in FIG. 1) for providing store payment service may receive data from the image sensor 210 and the weight sensor 220 of the sensor module 200, respectively. The processor 110 (for example, the trigger generation module 115) may further use data obtained from the image sensor 210 when the trigger data is generated.

For example, the shelf 300 in the store may include the first plate 1001 and the second plate 1002. A plurality of products may be displayed on each of the first plate 1001 and the second plate 1002. The first plate 1001 and the second plate 1002 may be connected to the first weight sensor 1011.

The processor 110 (for example, the data collection module 111) may receive the shelf image data including the first shelf image data and the second shelf image data from the image sensor 210. The shelf image data may be image data of the shelf 300 related to the position of the first weight sensor 1011 where the weight change is detected.

Referring to FIGS. 10, 11, and 12, in order to identify the user related to the trigger, the processor 110 (for example, the data collection module 111 and the trigger generation module 115) may first identify trigger data further including at least one of the weight change received from the first weight sensor 1011 and the second interaction information identified from the plurality of image data received from the image sensor 210 at S601.

By receiving the weight change from the first weight sensor 1011, the processor 110 may include, in the trigger data, at least one of the weight change time point, the position where the weight is changed, and whether the product is added or removed according to the weight change.

The processor 110 may identify, from the shelf image data, that the second interaction in which the product is placed on the shelf or the product is removed from the shelf is generated. The processor 110 may identify the second interaction information including information about the time point at which the second interaction is generated, the position where the second interaction is generated, and the user who is a subject of the second interaction.

The processor 110 (for example, the final determination module 117) may identify the user candidate group based on the first tracking data and the trigger data at S603. The processor 110 may include the identified user in the user candidate group by identifying the position where the second interaction is generated and/or the user who is the subject of the second interaction in the first tracking data. For example, the processor 110 may include the identified user in the user candidate group by identifying the position of the weight change or the position where the second interaction is generated in the first tracking data, and identifying at least one user whose hand is close to the position.

The processor 110 may calculate the first reliability for each of at least some users included in the user candidate group at S409, and identify that the user related to the trigger is the first user based on the first reliability at S411.

Referring to FIGS. 10, 11, and 13A, in order to identify the product related to the trigger, the processor 110 (for example, the final determination module 117) may first estimate the product change position based on at least one of the weight change detected by the weight sensor (that is, the position where the trigger is generated) and the comparison result between the first shelf image data and the second shelf image data obtained based on the trigger time point at S701.

The shelf image data may include the first shelf image data at the start of the second time period and the second shelf image at the end of the second time period. The second time period may be a different time period from the first time period. However, it is not limited thereto, and the first time period and the second time period may refer to the same time period as needed.

For example, the processor 110 may identify the shelf 300 connected to the first weight sensor 1011 based on the weight change data received from the first weight sensor 1011. For example, the processor 110 may calculate the position where the weight change is actually generated based on the position and the weight change data for each of the plurality of weight sensors. The plurality of weight sensors may be a plurality of weight sensors located in the store. For example, the plurality of weight sensors may be installed in the same shelf (for example, the shelf 300).

In addition, the processor 110 may compare the first shelf image data before the trigger is generated with the second shelf image data after the trigger is generated to identify the product change on the shelf 300, thereby identifying the product change position where the product has changed.

The processor 110 (for example, the final determination module 117) may calculate the second reliability for each of the first product and the second product based on the product change position and the weight change at S703.

For example, the processor 110 may identify the first product and the second product displayed on the shelf 300 as the product candidate group based on the weight change and the product change position. The processor 110 may calculate the reliability for the first product and calculate the reliability for the second product. The second reliability may include the reliability for the first product and the reliability for the second product.

The processor 110 (for example, the final determination module 117) may identify that at least one of the plurality of products includes the first product based on the second reliability at S705. For example, the processor 110 may identify that at least one of the plurality of products related to the trigger includes the first product, based on the reliability of the first product being higher than the reliability of the second product.

Referring to FIGS. 10, 11, and 13B, in order to identify the product related to the trigger, the processor 110 (for example, the final determination module 117) may first estimate whether the product has changed based on at least one of a result of identifying the type and the number of products which each user candidate group holds, and a result of comparison between the first shelf image data and the second shelf image data on the basis of the product detection image at S702.

The processor 110 may identify the type and the number of products held by each user candidate group on the basis of the product detection image. In addition, the processor 110 may identify whether the type and the number of products held by each user candidate group change based on the product detection image.

The processor 110 (for example, the final determination module 117) may calculate the second reliability for each of the first product and the second product based on whether the product has changed at S704.

Hereinafter, an electronic device for providing store payment service according to an embodiment of the present disclosure will be described with reference to FIGS. 13B and 14 to 16. For clarity of explanation, duplicates with those described above are omitted.

Figure 14:
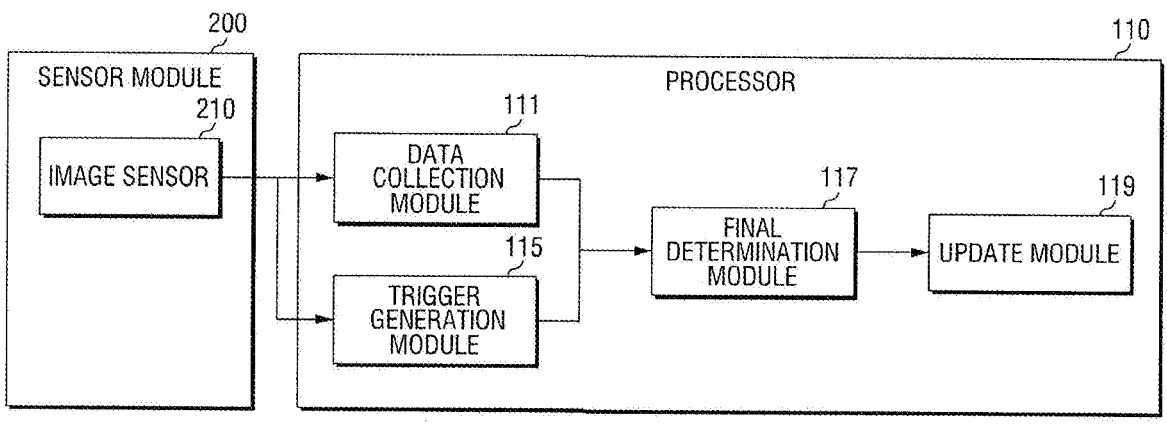
FIG. 14 is a diagram for explaining an electronic device for providing store payment service according to some embodiments of the present disclosure.
Figure 15:
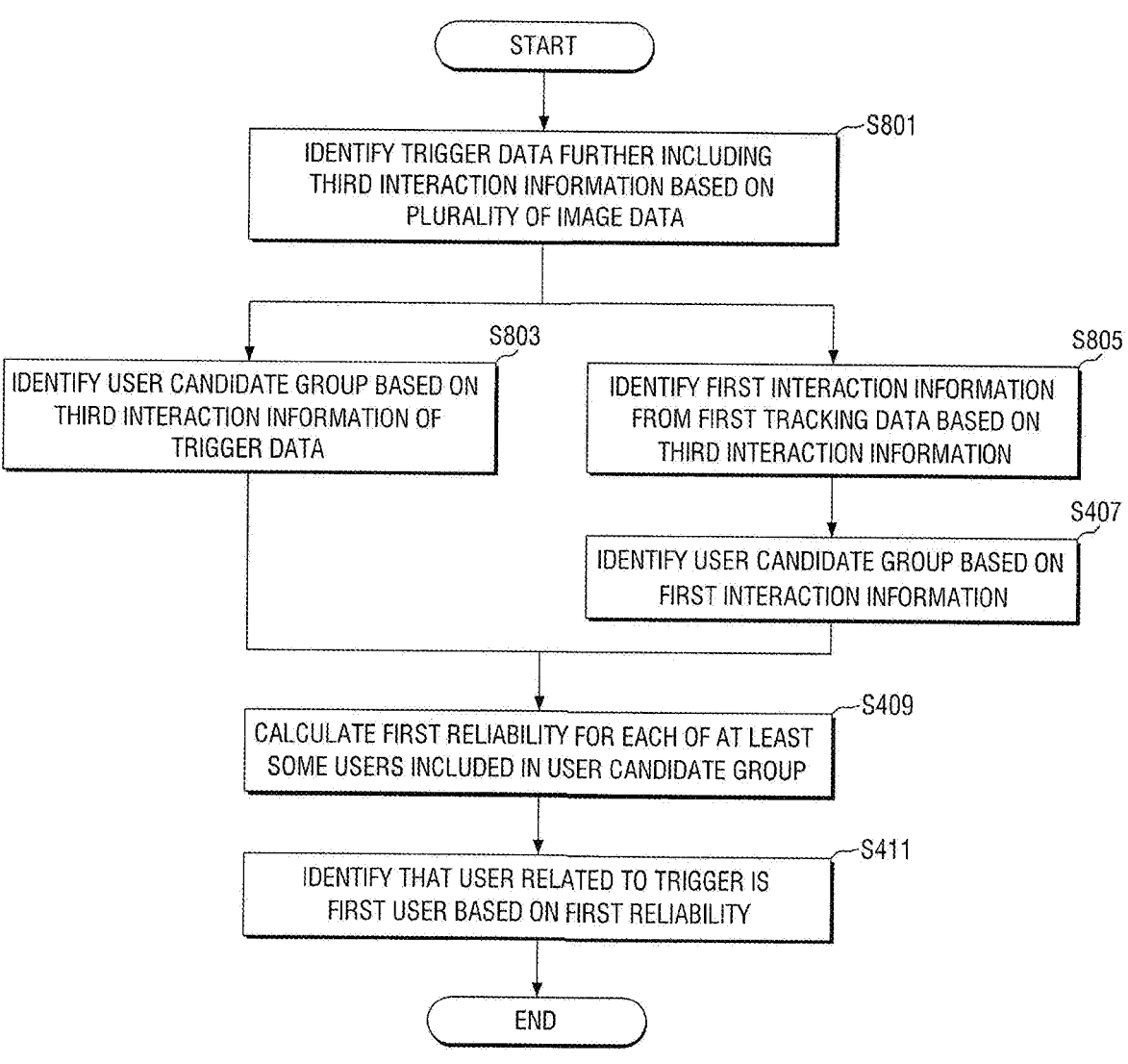
FIGS. 15 and 16 are flowcharts illustrating an electronic device for providing store payment service according to some embodiments of the present disclosure.
Figure 16:
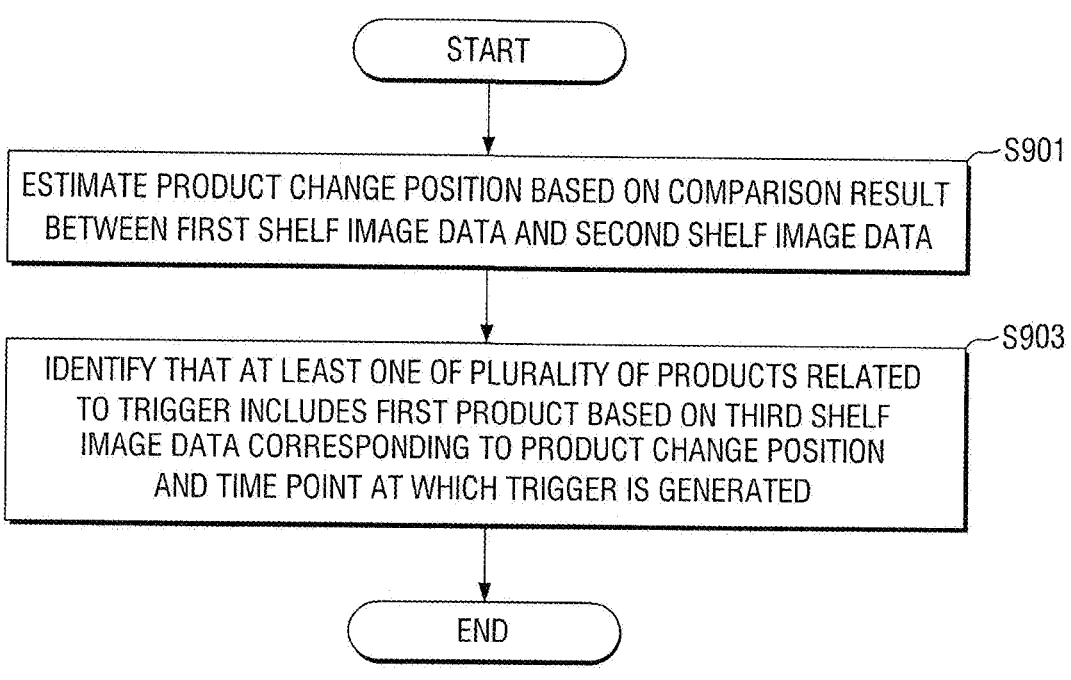

FIG. 14 is a diagram for explaining an electronic device for providing store payment service according to some embodiments of the present disclosure. FIGS. 15 and 16 are flowcharts illustrating an electronic device for providing store payment service according to some embodiments of the present disclosure.

Referring to FIGS. 14 and 15, the processor 110 of the electronic device (100 in FIG. 1) for providing store payment service the electronic device providing a store payment service may receive data from the image sensor 210 of the sensor module 200.

The processor 110 (for example, the data collection module 111 and the trigger generation module 115) may identify third interaction information based on the plurality of image data received from the image sensor 210, and include the third interaction information in the trigger data at S801. For example, the processor 110 may identify that the interaction is generated between the shelf and at least some (for example, the first user) of at least one user (for example, the first to third users) based on the plurality of image data. The processor 110 may identify the third interaction information including information about the time point at which the interaction is generated, the position where the interaction is generated, and the first user who is the subject of the interaction, and the third interaction information may be further included into the trigger data.

In a case where the first user identification method is used, the processor 110 (for example, the final determination module 117) may identify the user candidate group based on the third interaction information of the trigger data at S803. Since the third interaction information already includes information about the first user who is the subject of the interaction, the processor 110 may identify the user candidate group including the first user.

In a case where the second user identification method is used, the processor 110 (for example, the final determination module 117) may first identify the first interaction information from the first tracking data based on the third interaction information of the trigger data at S805. Since the third interaction information already includes information related to the interaction, the processor 110 may identify the first interaction information (information about the user who interacted with the first product and information including at least one of the interaction time point and the interaction position) used in the second user identification method based on the trigger data.

The processor 110 may identify the user candidate group based on the first interaction information at S407.

The processor 110 may calculate the first reliability for each of at least some users included in the user candidate group at S409, and identify that the user related to the trigger is the first user based on the first reliability at S411.

Referring to FIGS. 14 and 16, the processor 110 (for example, the final determination module 117) may estimate the product change position based on at least one of comparison results between the first shelf image data and the second shelf image data obtained on the basis of the trigger time point at S901.

The processor 110 (for example, the final determination module 117) may identify that at least one of the plurality of products related to the trigger includes the first product based on the third shelf image data corresponding to the product change position and the time point at which the trigger is generated at S903. For example, the processor 110 may identify that at least one of the plurality of products related to the trigger includes the first product by using image processing for the third shelf image data. Otherwise, for example, the processor 110 may identify that at least one of the plurality of products related to the trigger includes the first product by identifying the product change held in the user's hand in the first tracking data related to the start time when the trigger is generated.

Referring to FIGS. 13B and 14, in another example, in order to identify the product related to the trigger, the processor 110 (for example, the final determination module 117) may first estimate whether the product has changed based on at least one of a result of identifying the type and the number of products being held by each user candidate group and a result of comparing the first shelf image data and the second shelf image data on the basis of the product detection image at S702.

The processor 110 may identify the type and the number of products held by each user candidate group based on the product detection image. In addition, the processor 110 may identify whether the type and the number of products held by each user candidate group change based on the product detection image.

The processor 110 (for example, the final determination module 117) may calculate the second reliability for each of the first product and the second product based on whether the product has changed at S704.

Hereinafter, referring to FIG. 17, a method for providing store payment service according to an embodiment of the present disclosure will be described. For clarity of explanation, duplicates with those described above are omitted.

FIG. 17 is a flowchart for explaining the method for providing store payment service according to some embodiments of the present disclosure.

Hereinafter, it is assumed that the electronic device 100 providing store payment service of FIG. 1 performs the process of FIG. 17. The operation described as being performed by the electronic device 100 providing store payment service may be implemented with instructions (commands) which may be performed (or executed) by the processor 110 of the electronic device 100 providing store payment service. The instructions may be stored, for example, in a computer recording medium or in the memory 120 of the electronic device 100 providing store payment service of FIG. 1.

Referring to FIG. 17, the method for providing store payment service may include a step of receiving a plurality of image data at various angles and directions from the plurality of image sensors in the store at S1001.

The method for providing store payment service may include a step of generating a plurality of 2D pose data for each of a plurality of image data at S1003.

The method for providing store payment service may include a step of generating the 3D pose data for each of at least one user by combining each of the plurality of 2D pose data at S1005.

The method for providing store payment service may include a step of generating the tracking data for tracking the 3D pose data for each of at least one user according to the movement of each of at least one user in the store at S1007.

The method for providing store payment service may include a step of identifying the trigger data including the trigger time point at which the trigger is generated and the position where the trigger is generated at S1009.

The method for providing store payment service may include a step of identifying at least one of the plurality of products related to the trigger based on at least one of the trigger time point and the trigger position at S1011.

The method for providing store payment service may include a step of identifying the first tracking data of the tracking data corresponding to the first time period including the trigger time point at S1013.

The method for providing store payment service may include a step of identifying the user candidate group for at least some of at least one user based on the first tracking data at S1015.

The method for providing store payment service may include a step of calculating the first reliability for each of at least some users included in the user candidate group, and identifying that the user related to the trigger is the first user based on the first reliability at S1017.

The method for providing store payment service may include a step of performing an update related to the trigger for the virtual shopping cart of the first user at S1019.

The term "module" used in this document may include a unit implemented in hardware, software, or firmware, and may be used interchangeably with terms such as logic, logic block, component, or circuit, for example. The module may be an integrally constructed component, a minimal unit of components, or a portion thereof that performs one or more functions. For example, according to one embodiment, the module may be implemented in the form of an application-specific integrated circuit (ASIC).

Various embodiments of this document may be implemented as software (for example, a program) including one or more commands stored in a storage medium (for example, the memory 120) that may be read by a machine (for example, the electronic device 100 providing store payment service). For example, a processor (for example, the processor 110) of the machine (for example, the electronic device 100 providing store payment service) may call at least one command among one or more commands stored in the storage medium, and may execute the command. This enables the machine to be operated to perform at least one function according to at least one called command. The one or more commands may include a code generated by a compiler or a code executable by an interpreter. The machine-readable storage medium may be provided in the form of a non-transitory storage medium. Here, 'non-temporary' only means that the storage medium is a tangible device and does not include a signal (for example, an electromagnetic wave), and this term does not discriminate a case where data is stored semi-permanently in the storage medium and a case where data is temporarily stored.

According to one embodiment, the method according to various embodiments disclosed in this document may be included and provided in a computer program product. The computer program product may be distributed in the form of a device-readable storage medium (for example, compact disc read only memory (CD-ROM)), or may be, with online, directly distributed (for example, downloaded or uploaded) through an application store (for example, Play Store™) or between two user devices (for example, smartphones). In the case of online distribution, at least some of the computer program products may be temporarily stored or temporarily generated in a device-readable storage medium such as a manufacturer's server, an application store server, or a relay server's memory.

According to various embodiments, each component (for example, module or program) of the components described above may include a singular object or a plurality of objects. According to various embodiments, one or more components or operations among the aforementioned components may be omitted, or one or more other components or operations may be added. Alternatively or additionally, a plurality of components (for example, modules or programs) may be integrated into a single component. In this case, the integrated component may perform one or more functions of each of the plurality of components identically or similarly to those performed by the corresponding component of the plurality of components prior to the integration. According to various embodiments, operations performed by modules, programs, or other components are executed sequentially, in parallel, iteratively, or heuristically, or one or more of the operations are executed in a different order or omitted, or one or more other operations may be added.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. An electronic device for providing store payment service comprising: a processor; and a memory operatively coupled to the processor, wherein the memory, when executed, causes the processor to receive a plurality of image data from a plurality of image sensors in the store, generate a plurality of 2D pose data by estimating a joint position of each of at least one user and a posture of each of the at least one user for each of the plurality of image data based on that the at least one user is included in the plurality of image data, combine each of the plurality of 2D pose data to generate 3D pose data for each of the at least one user that matches each of the at least one user, and generate tracking data for tracking the 3D pose data for each of the at least one user according to a movement of each of the at least one user in the store, according to lapse of time and the tracking data comprises information about movement of the 3D pose data and time information, identify trigger data including a trigger time point at which a trigger, in which at least one of a plurality of products displayed in the store is removed from a shelf or added to the shelf, is generated, and a position where the trigger is generated, and a weight change detected by a weight sensor connected to the shelf, according to lapse of time and the tracking data comprises information about movement of the 3D pose data and time information, identify at least one of the plurality of products related to the trigger by: identifying shelf image data at the trigger time point for the shelf related to the trigger, wherein the shelf image data includes first shelf image data at a start of a second time period and second shelf image data at an end of the second time period; identifying product detection image data related to the user candidate group in a first time period; and identifying a first product using at least one of a first product identification method and a second product identification method, wherein the first product identification method estimates a product change position based on at least one of the trigger time point weight change and a comparison result between the first shelf image data and the second shelf image data, calculates a second reliability for each of the first product and a second product as product candidates based on the product change position where and the trigger weight change, and identifies that the at least one of the plurality of products includes the first product based on the second reliability, and wherein the second product identification method estimates whether the product is generated changed based on at least one of a result of identifying the type and the number of products held by each of the user candidate groups and the comparison result, on the basis of the product detection image data, calculates the second reliability for each of the first product and the second product based on whether the product is changed, and identifies that the at least one of the plurality of products includes the first product based on the second reliability, identify first tracking data of the tracking data corresponding to a the first time period including the trigger time point, identify a user candidate group for at least some of the at least one user based on the first tracking data, calculate a first reliability for each of the at least some users included in the user candidate group, identify that a user related to the trigger is a first user based on the first reliability, and store instructions for performing an update related to the trigger for a virtual shopping cart of the first user.

2. The electronic device for providing store payment service of claim 1, wherein instructions cause the processor to determine whether the plurality of products on the shelf is changed based on at least one of shelf image data received from the plurality of image sensors, user image data including at least one user received from the plurality of image sensors, and weight data received from a weight sensor connected to the shelf, and determine validity of the trigger data based on the determination.

3. The electronic device for providing store payment service of claim 1, wherein the instructions cause the processor to identify the first user using at least one of a first user identification method and a second user identification method, the first user identification method identifies the user candidate group based on whether the shelf related to the trigger is accessed on the basis of the first tracking data, and the second user identification method identifies first interaction information interacting with at least one of the plurality of products in the first tracking data, and identifies the user candidate group based on the first interaction information.

4. The electronic device for providing store payment service of claim 3, wherein the instructions cause the processor to identify the trigger data further including a weight change detected by a first weight sensor between the first weight sensor connected to a first plate on which the first product is displayed and a second weight sensor connected to a second plate on which the second product is displayed on the shelf, and at least one of the plurality of products related to the trigger includes the first product based on at least one of the position of the first weight sensor which is the position where the trigger is generated, and shelf image data including an image of the first plate.

5. The electronic device for providing store payment service of claim 3, wherein the instructions cause the processor to identify the trigger data further including at least one of a weight change detected by a weight sensor connected to the shelf including a first plate on which the first product is displayed and a second plate on which the second product is displayed, and second interaction information based on the plurality of image data, identify the user candidate group based on the first tracking data and the trigger data when the first user identification method is used, and identify the user candidate group based on the first interaction information including a result of identifying the type and the number of at least one of the plurality of products held by each of at least one user, and whether the type and the number of at least one of the plurality of products are changed when the second user identification method is used.

6. The electronic device for providing store payment service of claim 3, wherein the instructions cause the processor to identify third interaction information including time point of interaction, the position where the interaction is generated, and the information of the first user who is the subject of the interaction to identify a trigger data further including the third interaction information based on the plurality of image data when the interaction is generated between the shelf and the at least some of at least one user, identify the user candidate group based on the third interaction information of the trigger data when the first user identification method is used, identify the first interaction information in the first tracking data based on the third interaction information when the second user identification method is used, and identify the user candidate group based on the first interaction information.

7. The electronic device for providing store payment service of claim 6, wherein instructions cause the processor to identify the first product using at least one of a first product identification method and a second product identification method, the first product identification method estimates a product change position based on a comparison result between first shelf image data at the start of second time period and second shelf image data at the end of the second time period, and identifies that at least one of the plurality of products related to the trigger includes the first product based on third shelf image data corresponding to the product change position and a time point at which the trigger is generated, and the second product identification method estimates whether a product is changed based on at least one of a result of identifying the type and the number of products held by each of the user candidate groups based on the product detection image data and the comparison result, and calculates a second reliability for each of the first product and the second product based on whether the product is changed, and identify at least one of the plurality of products include the first product based on the second reliability.

8. A method for providing store payment service, the method comprising: receiving a plurality of image data from a plurality of image sensors in a store; generating a plurality of 2D pose data estimating a joint position of each of at least one user and a posture of each of the at least one user for each of the plurality of image data based on that the at least one user is included in the plurality of image data; combining each of the plurality of 2D pose data to generate 3D pose data for each of the at least one user that matches each of the at least one user, and generate tracking data for tracking the 3D pose data for each of the at least one user according to a movement of each of the at least one user in the store; according to lapse of time and the tracking data comprises information about movement of the 3D pose data and time information, identifying trigger data including a trigger time point at which a trigger, in which at least one of a plurality of products displayed in the store is removed from a shelf or added to the shelf, is generated, and a position where the trigger is generated, and a weight change detected by a weight sensor connected to the shelf; identifying at least one of the plurality of products related to the trigger by: identifying shelf image data at the trigger time point for the shelf related to the trigger, wherein the shelf image data includes first shelf image data at a start of a second time period and second shelf image data at an end of the second time period; identifying product detection image data related to the user candidate group in a first time period; and identifying a first product using at least one of a first product identification method and a second product identification method, wherein the first product identification method estimates a product change position based on at least one of the trigger time point weight change and a comparison result between the first shelf image data and the second shelf image data, calculates a second reliability for each of the first product and a second product as product candidates based on the product change position where and the trigger weight change, and identifies that the at least one of the plurality of products includes the first product based on the second reliability, and wherein the second product identification method estimates whether the product is generated changed based on at least one of a result of identifying the type and the number of products held by each of the user candidate groups and the comparison result, on the basis of the product detection image data, calculates the second reliability for each of the first product and the second product based on whether the product is changed, and identifies that the at least one of the plurality of products includes the first product based on the second reliability; identifying first tracking data of the tracking data corresponding to a a first time period including the trigger time point; identifying a user candidate group for at least some of the at least one user based on the first tracking data; calculating a first reliability for each of the at least some users included in the user candidate group; identifying that a user related to the trigger is a first user based on the first reliability; and performing an update related to the trigger for a virtual shopping cart of the first user.

* * * * *